(12) United States Patent
Jang et al.

(10) Patent No.: US 11,879,200 B2
(45) Date of Patent: Jan. 23, 2024

(54) WASHING MACHINE HAVING CIRCULATION NOZZLES

(71) Applicant: LG Electronics Inc., Seoul (KR)

(72) Inventors: Hosung Jang, Seoul (KR); Kwanghyun Kim, Seoul (KR); Sunghoon Kim, Seoul (KR); Jaehyun Choi, Seoul (KR); Yohwan Kang, Seoul (KR); Hansol Kim, Seoul (KR); Hwanchan Ryu, Seoul (KR); Hyunjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 17/521,502

(22) Filed: Nov. 8, 2021

(65) Prior Publication Data

US 2022/0064841 A1    Mar. 3, 2022

Related U.S. Application Data

(63) Continuation of application No. 16/455,167, filed on Jun. 27, 2019, now Pat. No. 11,193,232.

(30) Foreign Application Priority Data

Jun. 27, 2018  (KR) .................. 10-2018-0074353
Jun. 27, 2018  (KR) .................. 10-2018-0074357

(Continued)

(51) Int. Cl.
*D06F 39/08* (2006.01)
*D06F 37/26* (2006.01)
*D06F 37/04* (2006.01)

(52) U.S. Cl.
CPC ............ *D06F 37/266* (2013.01); *D06F 37/04* (2013.01); *D06F 39/083* (2013.01); *D06F 39/088* (2013.01); *D06F 39/085* (2013.01)

(58) Field of Classification Search
CPC ...... D06F 39/088; D06F 39/085; D06F 37/04; D06F 37/266
See application file for complete search history.

(56) References Cited

U.S. PATENT DOCUMENTS 11,168,435 B2 *  11/2021  Kim .................. D06F 39/083
11,193,232 B2 *  12/2021  Jang ................... D06F 37/04
(Continued)

FOREIGN PATENT DOCUMENTS

CN         2372345          4/2000
CN        101353857         1/2009
(Continued)

OTHER PUBLICATIONS

Office Action in Japanese Appln. No. 2020-572540, dated Feb. 8, 2022, 10 pages (with English translation).
(Continued)

*Primary Examiner* — Joseph L. Perrin
*Assistant Examiner* — Irina Graf
(74) *Attorney, Agent, or Firm* — Fish & Richardson P.C.

(57) ABSTRACT

A washing machine includes a gasket including a gasket body that connects a casing to a tub, and a plurality of nozzles spraying water into a drum. The gasket body has a first area and a second area corresponding to bilateral areas. The nozzles include a first nozzle and a second nozzle disposed in the first area sequentially in a bottom-to-top direction. The washing machine includes a distribution pipe for distribution circulating water to the nozzles, and the distribution pipe includes a first outlet port and a second outlet port for supplying water to first and second nozzles, and a third outlet port and a fourth outlet port for supplying water to third and fourth nozzles. The first and second outlet ports extend parallel to each other, and the third and fourth outlet ports extend parallel to each other.

13 Claims, 22 Drawing Sheets

(30) Foreign Application Priority Data

| Jun. 27, 2018 | (KR) | 10-2018-0074380 |
| Jun. 27, 2018 | (KR) | 10-2018-0074387 |
| Jun. 25, 2019 | (KR) | 10-2019-0075433 |

(56) References Cited

U.S. PATENT DOCUMENTS

| 11,332,871 | B2 * | 5/2022 | Kim | D06F 37/266 |
| 11,499,261 | B2 * | 11/2022 | Lee | D06F 23/06 |
| 11,519,121 | B2 * | 12/2022 | Jang | D06F 39/083 |
| 2010/0251784 | A1 | 10/2010 | Lee et al. | |
| 2011/0083477 | A1 | 4/2011 | Kim et al. | |
| 2012/0167639 | A1 | 7/2012 | Kikukawa et al. | |
| 2014/0033449 | A1 | 2/2014 | Im et al. | |
| 2014/0203553 | A1 | 7/2014 | Niubo | |
| 2014/0352363 | A1 | 12/2014 | Kim | |
| 2017/0211223 | A1 | 7/2017 | Cho et al. | |

FOREIGN PATENT DOCUMENTS

| CN | 101925699 | 12/2010 |
| CN | 102121186 | 7/2011 |
| CN | 102418257 | 4/2012 |
| CN | 102597355 | 7/2012 |
| CN | 102639775 | 8/2012 |
| CN | 104213372 | 12/2014 |
| CN | 104233694 | 12/2014 |
| CN | 107503088 | 12/2017 |
| EP | 2471993 | 7/2012 |
| EP | 2634303 | 9/2013 |
| EP | 2719814 | 4/2014 |
| EP | 2808435 | 12/2014 |
| EP | 3483329 | 5/2019 |
| JP | 2011139815 | 7/2011 |
| JP | 2012070810 | 4/2012 |
| KR | 1020110040179 | 4/2011 |
| WO | WO 2016/006323 | 1/2016 |
| WO | WO2016136154 | 9/2016 |

OTHER PUBLICATIONS

CN Office Action in Chinese Appln. No. 201910565735.1, dated Feb. 1, 2021, 17 pages (with English translation).

Extended European Search Report in European Application No. 19182778.1, dated Nov. 25, 2019, 9 pages.

PCT International Search Report in International Application No. PCT/KR2019/007668, dated Oct. 24, 2019, 5 pages.

Office Action in Chinese Appln. No. 202210372747.4, dated Mar. 24, 2023, 21 pages (with English translation).

* cited by examiner

WASHING MACHINE HAVING CIRCULATION NOZZLES

CROSS-REFERENCE TO RELATED APPLICATIONS

This application is a continuation of U.S. application Ser. No. 16/455,167, filed on Jun. 27, 2019, which claims the priority benefit of Korean Application No. 10-2019-0075433, filed on Jun. 25, 2019, Korean Application No. 10-2018-0074387, filed on Jun. 27, 2018, Korean Application No. 10-2018-0074380, filed on Jun. 27, 2018, Korean Application No. 10-2018-0074357, filed on Jun. 27, 2018, and Korean Application No. 10-2018-0074353, filed on Jun. 27, 2018. The disclosures of the prior applications are incorporated by reference in their entirety.

BACKGROUND OF THE INVENTION

1. Field of the Invention

The present invention relates to a washing machine and particularly to a washing machine in which a nozzle for spraying circulating water into a drum is disposed at a gasket.

2. Description of the Related Art

Korean Patent Application Publication No. 10-2018-0131897 (hereinafter, referred to as a "related art") discloses a washing machine having nozzles for spraying circulation water, pumped by a pump, into a drum. In the washing machine, a plurality of nozzles are provided along an inner circumferential surface of a gasket disposed between a casing forming an exterior appearance of the washing machine and a tub containing water, and a plurality of port receiving pipes communicates with the plurality of nozzles, respectively.

There is a guide pipe that guides water (circulating water) pumped by the pump. In the guide pipe, a plurality of outlet port protruding from an annular flow path is inserted into the plurality of port receiving pipes.

Each of the port receiving pipes protrude from an outer circumferential surface of a gasket approximately toward an outer side of a radial direction, and, in response, each of the outlet ports protrude from the annular flow path to an inner side of the radial direction.

In addition, since the outlet ports are inserted into the port receiving pipes in different directions, it is not possible to assemble two or more nozzle water supply ports to two or more port receiving pipes, and thus, a complicated fabricating process is required.

In addition, in order to mold a gasket in a shape in which port receiving pipes extend in the radial direction, a mold needs to be moved in a direction in which each of the port receiving pipes extends, and a more complex structure is required for the mold.

SUMMARY OF THE INVENTION

An object of the present invention is to provide a washing machine having a plurality of nozzles for spraying circulating water into a drum is provided in a gasket, and a distribution pipe for supplying the circulating water to the plurality of nozzles, wherein the washing machine is in a structure that allows the distribution pipe to be easily installed in the gasket.

A second object of the present invention is to provide a washing machine in which two or more outlet ports provided in the distribution pipe can be easily separated from port receiving pipes formed in the gasket.

In the washing machine of the present invention, wash water discharged from a tub accommodating a rotatable drum is pumped by a pump, and the wash water is guided along the distribution pipe to be supplied to the gasket.

The gasket includes a gasket body forming a passage connecting an entry hole, formed in a casing, and an entrance hole of the tub, and the plurality of nozzles is provided on the gasket body.

When the gasket body is bilaterally divided into a first area and a second area, the plurality of nozzles includes a first nozzle and a second nozzle disposed in the first area sequentially in a bottom-to-top direction, and a third nozzle and a fourth nozzle disposed in the second area sequentially in the bottom-to-top direction.

Wash water discharged from the pump is guided along a circulation pipe, and the wash water guided along the circulation pipe is distributed to the first, second, third, and fourth nozzles.

The distribution pipe includes an inlet port connected to the circulation pipe, a first conduit part disposed in the first area on an outer circumferential surface of the gasket body to guide some of wash water introduced through the inlet port, and a second conduit part disposed in the second area on the outer circumferential surface of the gasket body to guide supply the rest of the wash water introduced through the inlet port A first outlet port and a second outlet port are disposed in the first conduit part sequentially in the bottom-to-top direction to supply the wash water, guided along the first conduit part, to the first and second nozzles. The first and second outlet ports are disposed in parallel with each other.

A third outlet port and a fourth outlet port are disposed in the second conduit part sequentially in the bottom-to-top direction to supply the wash water, guided along the second conduit part, to the third and fourth nozzles. The third and fourth outlet ports are disposed in parallel with each other.

The first, second, third and fourth outlet ports may extend horizontally.

The first and second outlet ports may be disposed lower than half a height of the gasket body, and the third and fourth outlet ports may be disposed higher than half the height of the gasket body.

The first outlet port may be disposed at a height equal to a height of the second outlet port, and the third outlet port may be disposed at a height equal to a height of the fourth outlet port.

An exit of the first outlet port may be disposed farther from the gasket body than an exit of the second outlet port is.

The first conduit part may include a first flat surface formed flat on an inner circumferential part that opposes the gasket body, and the first outlet port may protrude from the first flat surface. The first outlet port may be orthogonal to the first flat surface.

The second conduit part may include a second flat surface formed flat on the inner circumferential part that opposes the gasket body, and the second outlet port may protrude from the second flat surface. The second outlet port may be orthogonal to the second flat surface.

The first outlet port and the third outlet port may be disposed symmetrically about a reference line that bilaterally divides the gasket body.

The second outlet port and the fourth outlet port may be disposed symmetrically about the reference line that bilaterally divides the gasket body.

A cross-sectional flow area of the second outlet port may be greater than a cross-sectional flow area of the first outlet port.

The gasket further may include a plurality of port receiving pipes that protrudes from an outer circumferential surface of the gasket body to be inserted into the first, second, third, and fourth nozzles, respectively, and the plurality of port receiving pipes may communicate with the first, second, third, and fourth nozzles, respectively.

The distribution pipe further may include a press-fitting protrusion that protrudes from an outer circumferential surface of at least one outlet port among the first, second, third, and fourth outlet ports to extend along a circumferential direction and presses an inner circumferential surface of a port receiving pipe corresponding to the at least one outlet port.

The press-fitting protrusion may be provided in plural in a length direction of the at least one outlet port.

The press-fitting protrusion may include a slope inclined toward a direction in which the at least one outlet port is inserted into the corresponding port receiving pipe.

The distribution pipe further may include an end protrusion protruding from an end of an outer circumferential surface of at least one outlet port among the first, second, third, and fourth outlet ports to pass an entrance of a nozzle corresponding to the at least one outlet and be inserted into an exit of the corresponding nozzle, and a diameter of the corresponding nozzle may be reduced from the entrance toward the exit.

In another aspect of the present invention, a washing machine includes: a casing having an entry hole formed in a front surface of the casing; a tub provided in the casing to contain wash water, and having an entrance hole formed in the front surface of the tub; a drum rotatably provided in the tub; a gasket, wherein the gasket comprises a gasket body forming a passage connecting the entry hole and the entrance hole of the tub, and a plurality of nozzles spraying the wash water into the drum, and wherein, when the gasket body is bilaterally divided into a first area and a second area, the plurality of nozzles comprises a first nozzle and a second nozzle disposed in the first area sequentially in a bottom-to-top direction; a pump configured to pump the wash water discharged from the tub; a first circulation pipe guiding the wash water discharged from the pump; and a first distribution pipe distributing the wash water guided through the circulation pipe into the first and second nozzles, wherein the first distribution pipe comprises: a first inlet port connected to the first circulation pipe; a first conduit part disposed in the first area on an outer circumferential surface of the gasket body to upwardly guide wash water introduced through the first inlet port; a first outlet port and a second outlet port disposed on the first conduit part sequentially in the bottom-to-top direction to supply the wash water, guided along the first conduit part, to the first and second nozzles, and extending in parallel from the first conduit part toward the outer circumferential surface of the gasket body.

The plurality of nozzles may further include a third nozzle and a fourth nozzle disposed in the second area sequentially in the bottom-to-top direction, and the washing machine may further include: a second circulation pipe guiding the wash water discharged from the pump; and a second distribution pipe distributing the wash water guided through the second circulation pipe into the first and second nozzles, and the second distribution pipe may include: a second inlet port connected to the second circulation pipe; a second conduit part disposed in the second area on the outer circumferential surface of the gasket body to upwardly guide wash water introduced through the second inlet port; and a third outlet port and a fourth outlet port disposed on the second conduit part sequentially in the bottom-to-top direction to supply the wash water, guided along the second conduit part, to the third and fourth nozzles, and extending in parallel from the second conduit part toward the outer circumferential surface of the gasket body.

The washing machine of the present invention may have one or more effects, as below.

First, since two or more port receiving pipes integrally formed with the gasket are disposed to be parallel to each other, it is possible to perform an opening or separating operation even if the two or more nozzles are injected using a movable mold.

Second, the two or more port receiving pipes are, when seen from the front, parallelly formed in one of a first area and a second area into which the gasket is divided, and thus, if the distribution pipe is installed to the gasket, the outlet ports provided in the distribution pipe may be moved in the substantially identical direction, and therefore, the outlet ports can be inserted into the port receiving pipes at the same time and the assembling process may be performed more conveniently.

In particular, in a structure in which the distribution pipe includes a first conduit part and a second conduit part that are branched from a circulating water connection port, in which the two or more outlet ports are formed in one of the first conduit part and the second conduit part, in which the two or more outlet ports extend in a radial direction and the two or more port receiving pipes extend in the radial direction, it is difficult to insert the outlet ports into the port receiving pipes at the same time because the directions for the outlet orts to be inserted are different. However, the present invention solves this problem as the port receiving pipes (or the outlet ports) are disposed to be parallel to each other.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
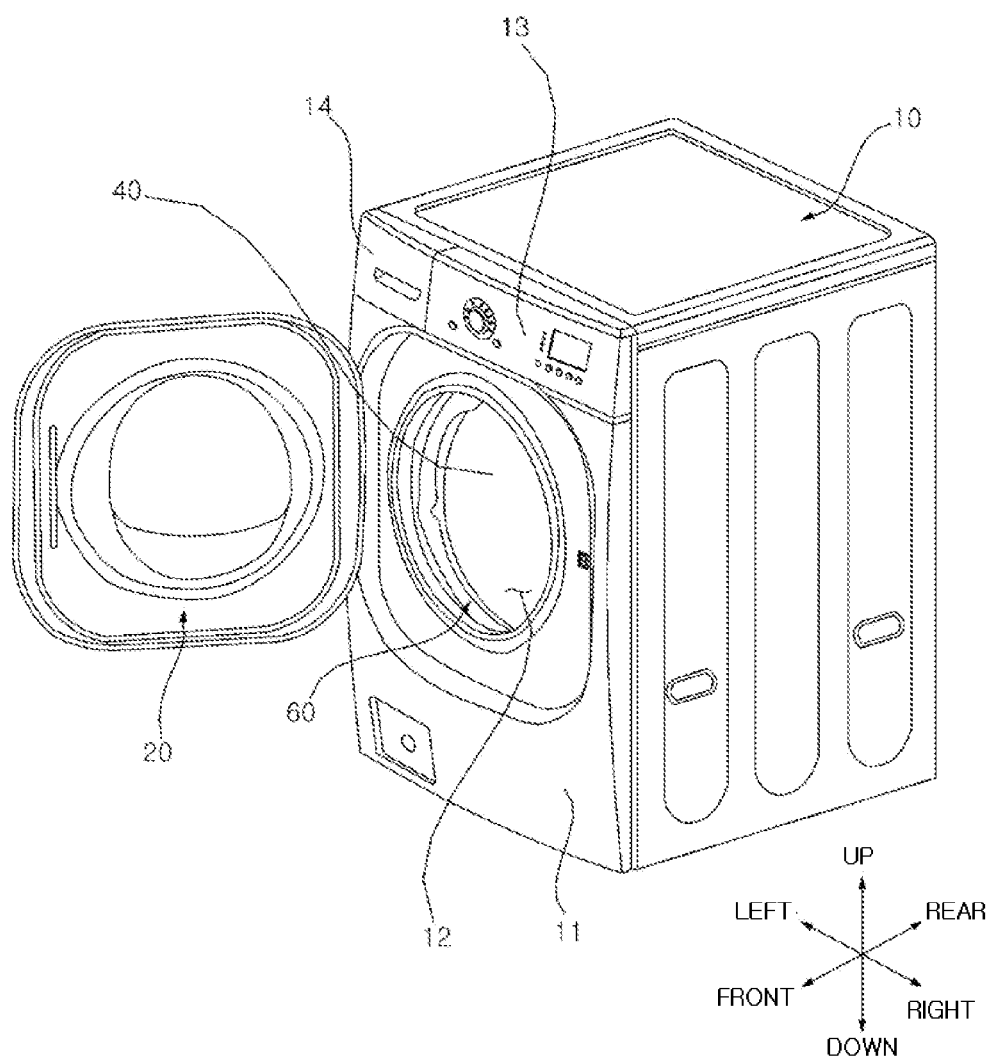
FIG. 1 is a perspective view of a washing machine according to an embodiment of the present invention.
Figure 2:
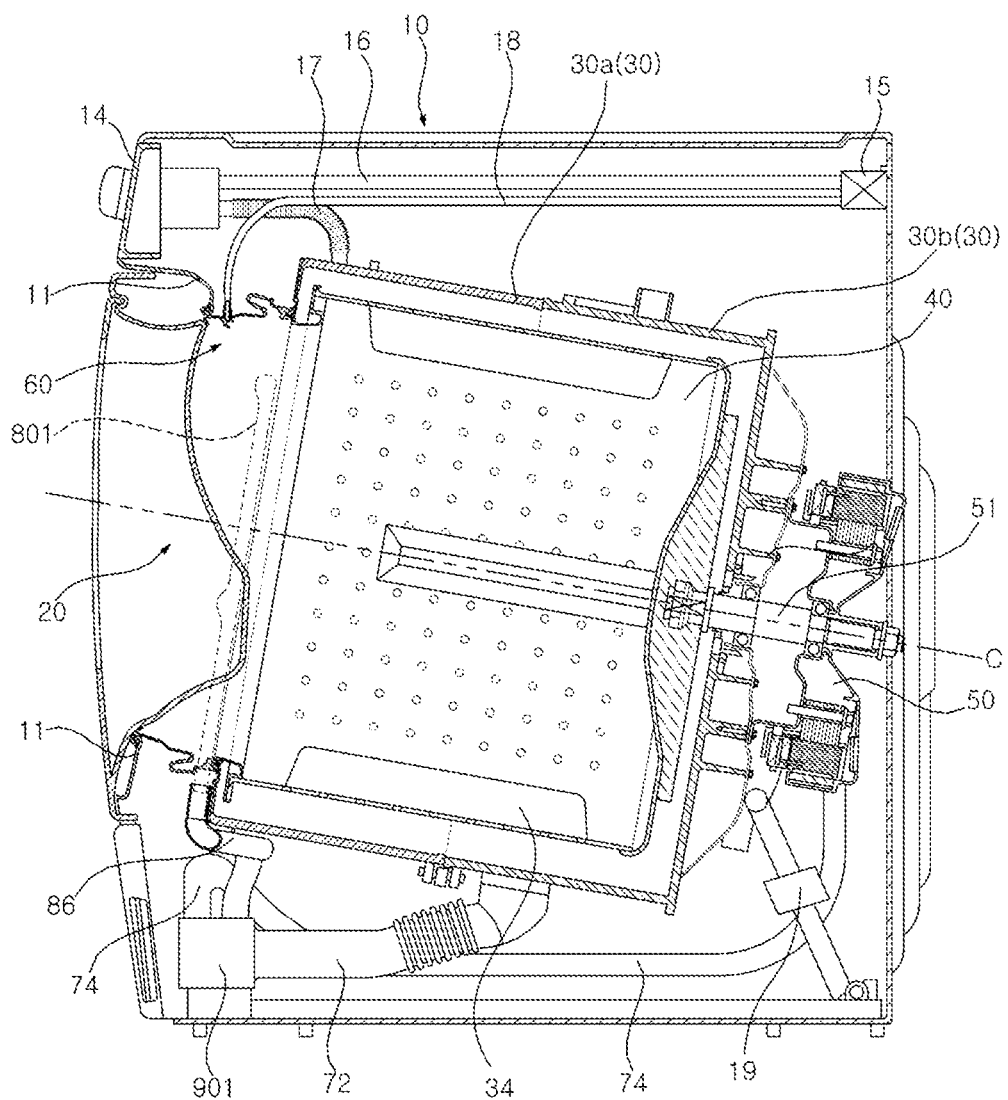
FIG. 2 is a cross-sectional view illustrating the interior of the washing machine shown in FIG. 1.

Advantages and features of the present disclosure and methods to achieve them will become apparent from the descriptions of exemplary embodiments herein below with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims. Like reference numerals denote like elements throughout the descriptions.

Hereinafter, the present invention will be described in detail with reference to the accompanying drawings.

Referring to FIGS. 1 to 4, a washing machine according to an embodiment of the present invention includes a casing 10 forming an exterior appearance of the washing machine, a tub 30 disposed in the casing 10 and containing wash water, a drum 40 rotatably installed in the tub 30 to receive laundry, and a motor 50 rotating the drum 40.

A front panel 11 having an entry hole 12 formed therein may be disposed on a front surface of the casing 10. A door 20 for opening and closing the entry hole 12 may be disposed on the front panel 11, and a dispenser 14 for introducing detergent may be installed at the front panel 11.

In addition, a water supply valve 15, a water supply pipe 16, and a water supply hose 17 may be installed in the casing 10. Upon a water supply, wash water having passed through the water supply valve 15 and the water supply pipe 16 may be mixed with detergent in the dispenser 14 and then supplied to the tub 30 through the water supply hose 17.

Meanwhile, a direct water supply pipe 86 may be connected to the water supply valve 15 so that wash water can be supplied directly to the tub 30 through the direct water supply pipe 86 without being mixed with detergent.

A tub containing water may be disposed inside the casing 10. An entrance hole (or an opening 31h) is formed on the front surface of the tub 30 to receive laundry. The cabinet 11 and the tub 30 may be connected by an annular gasket 60.

Meanwhile, the tub 30 may be formed as a single tub body or may be formed as a combination of a first tub body 30a and a second tub body 30b coupled thereto. In the embodiment of the present invention, an example in which the first tub body 30a and the second tub body 30b are coupled to form the tub 30 is described. Hereinafter, the first tub body 30a is referred to as a "tub" 30.

The gasket 60 prevents leakage of water contained in the tub 30. The gasket 60 may extend from an annular front part to an annular rear part to thereby form an annular passage that connects the entry hole 12 and the opening 31h. The front part of the gasket 60 may be fixed to the front panel 11 of the casing 10, and the rear part of the gasket 60 may be fixed to a circumference of the opening 31h of the tub 30.

The gasket 60 may be formed of a flexible or elastic substance. The gasket 60 may be formed of natural rubber or synthetic resin. The gasket 60 may be formed of a substance such as Ethylene Propylene Diene Monomer (EPDM), Thermo Plastic Elastomer (TPE), or the like. Hereinafter, a portion defining the inside of the annular shape of the gasket 60 is referred to as an inner circumferential part (or an inner circumferential surface) of the gasket 60, and a portion opposite thereto is referred to as an outer circumferential part (or an outer circumferential surface) of the gasket 60.

A drum 40 receiving laundry may be rotatably provided in the tub 30. In order to allow water contained in the tub to flow into the drum 40, a plurality of through holes may be formed in the drum 40.

The drum 40 is disposed in such a way that an entrance hole to receive laundry is disposed at a front surface of the drum 40, and the drum 40 is rotated about a rotation center line C that is approximately horizontal. In this case, "horizontal" does not refer to the mathematical definition thereof. That is, even in the case where the rotation center line C is inclined at a predetermined angle relative to a horizontal state, the axis is more like in the horizontal state than in a vertical state, and thus, it is considered that the rotation center line is substantially horizontal.

A plurality of lifter 34 may be provided on an inner surface of the drum 40. The plurality of liters 34 may be disposed at a predetermined angle relative to the center of the drum 40. When the drum 40 is rotated, laundry repeatedly goes through an operation of being lifted by the lifter 34 and falling.

A driving unit 50 for rotating the drum 40 may be further provided. A driving unit 51 to be rotated by the driving unit 50 may penetrate the rear of the tub 30 to be coupled to the drum 40.

Preferably, the driving unit 50 includes a direct drive wash motor, and the wash motor may include a stator fixed to the rear of the tub 30, and a rotor rotating by a magnetic force acting in relation with the stator. The driving unit 51 may rotate integrally with the rotor.

The tub 30 may be supported by a damper 19 installed at the base 15. Vibration of the tub 30 caused by rotation of the drum 40 is attenuated by the damper 19. In some embodiments, although not illustrated, a hanger (e.g., a spring) for hanging the tub 30 to the casing 10 may be further provided.

Additives may be contained in the dispenser 14 separately by types thereof. The dispenser 35 may include a detergent container (not shown) for containing detergent for washing, and a fabric softener container (not shown) for containing a fabric softener.

In addition, a pump 901 may be installed in the casing 10. The pump 901 may be connected to the tub 30 by the discharge hose 72. The distribution pipe 80 may be installed in the gasket 60, and the distribution pipe 80 may be connected to the pump 901 by the circulation pipe 86. Wash water discharged from the tub 30 through the discharge hose 72 may be pumped by the pump 901, guided along the distribution pipe 80, and then sprayed into the drum 40 through the nozzles 65a, 65b, 65c, and 65d provided on the gasket 60.

Meanwhile, the drain pipe 74 is also connected to the pump 901, and thus wash water may be discharged to the outside through the drain pipe 74. That is, the pump 901 according to an embodiment of the present invention functions both as a drain pump for discharging water to the outside and as a circulation pump for circulating wash water. On the contrary, a drain pump and a circulation pump may be installed individually. In this case, the drain pipe 74 may be connected to the drain pump, and the circulation pipe 86 may be connected to the circulation pump.

Figure 3:
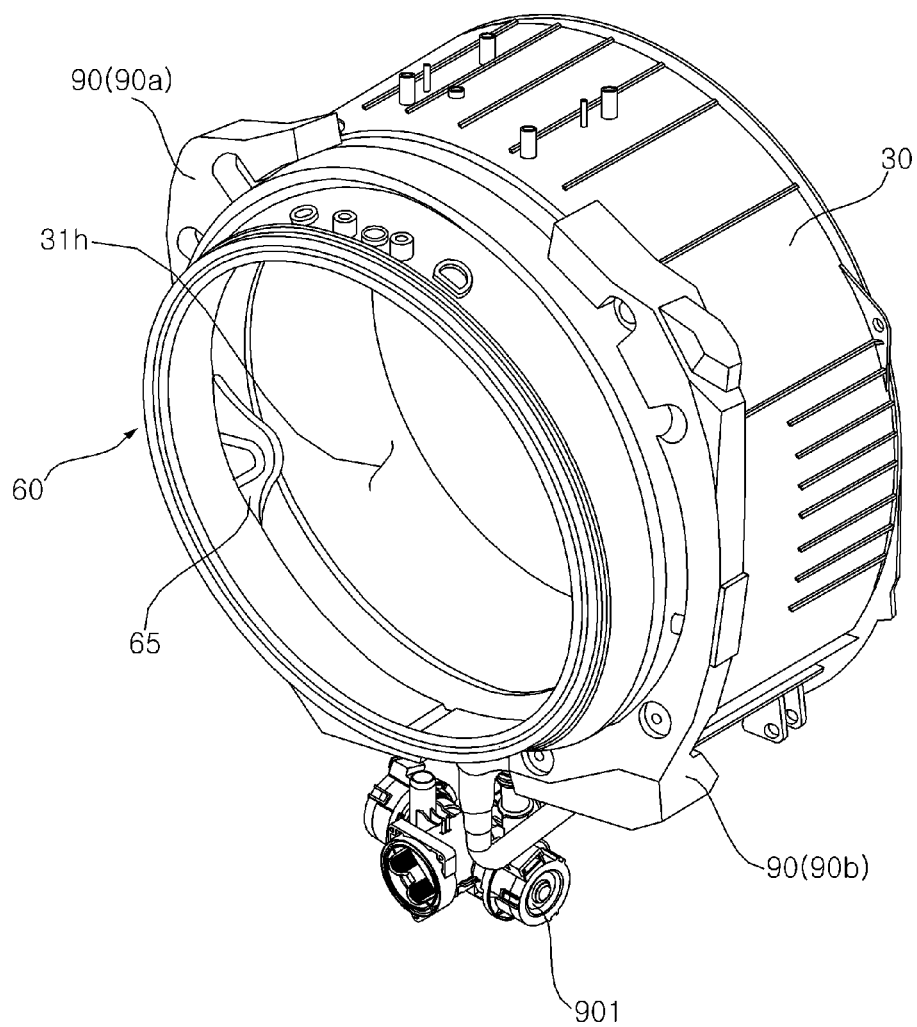
FIG. 3 is a perspective view illustrating part of the washing machine shown in FIG. 2.
Figure 4:
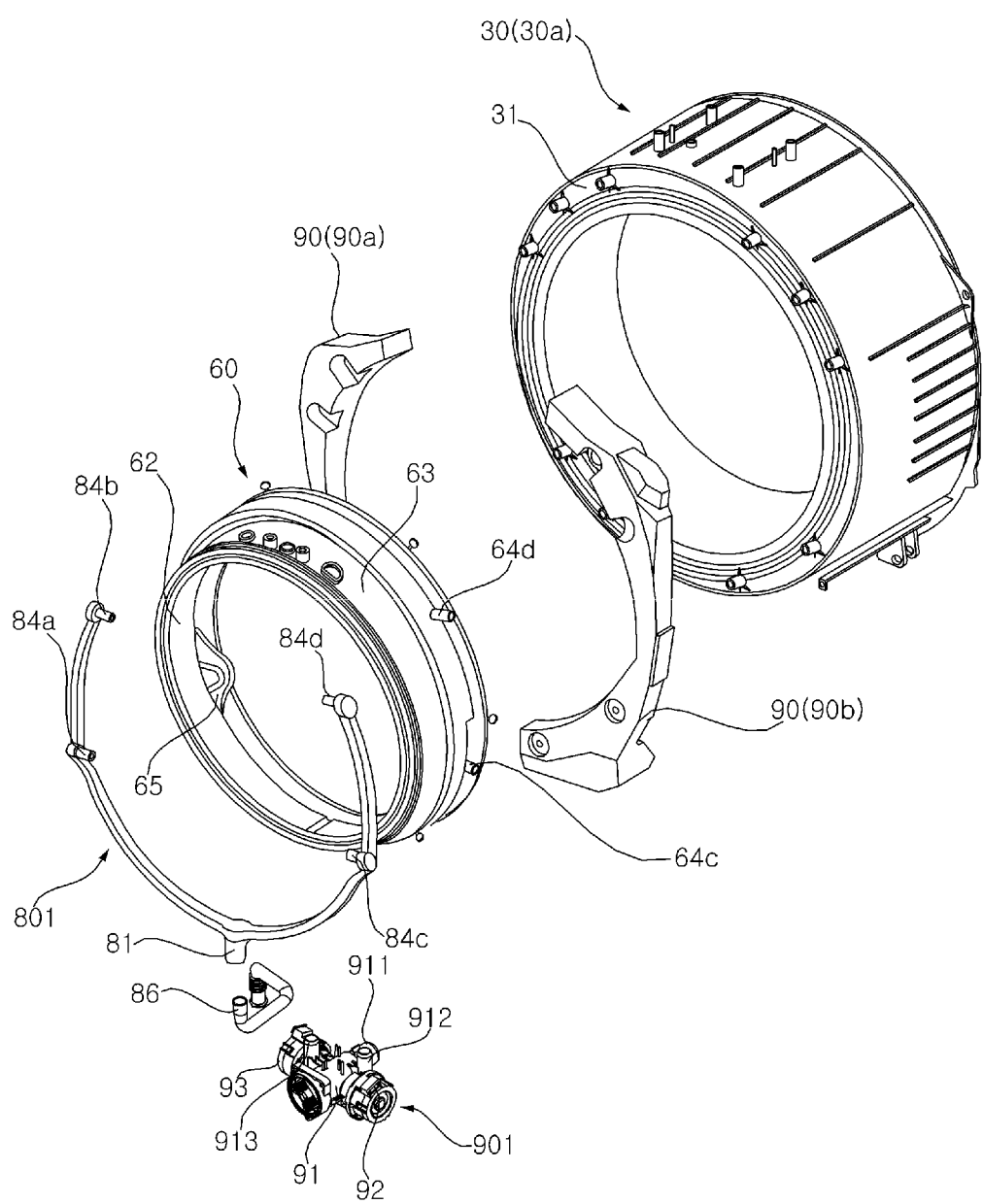
FIG. 4 is an exploded perspective view of an assembly shown in FIG. 3.
Figure 5:
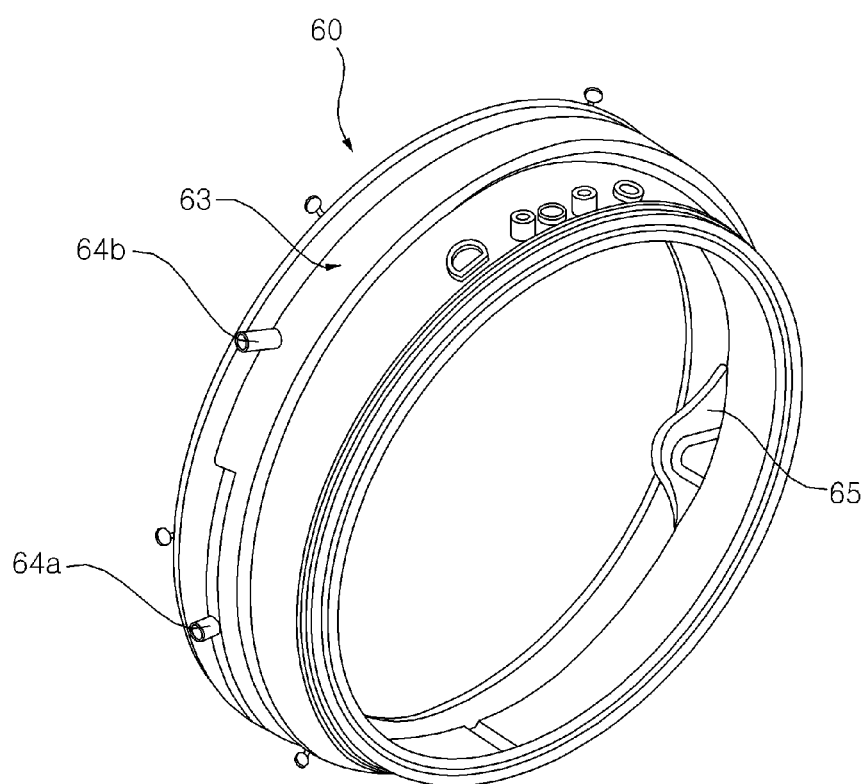
FIG. 5 is a perspective view of the gasket shown in FIG. 4.

Referring to FIGS. 3 and 4, the balancer 90 may be fastened to the front surface 31 of the tub 30. The balancer 90 may include a first balancer 90 disposed on the left side of the front surface 31 of the tub, and a second balancer 90b disposed on the right side of the front surface 31 of the tub 30.

An upper end of the first balancer 90a and an upper end of the second balancer 90b may be spaced apart from each other. A lower end of the first balancer 90a and a lower end of the second balancer 90b may be spaced apart from each other. The first and second balancers 90a and 90b may be in a shape bilaterally symmetrical about a reference line L passing through the center of the gasket 60, and the first and second balancers 90a and 90b may be disposed at positions bilaterally symmetrical with reference to the reference line L.

In the embodiment of the present invention, the balancer 90 is composed of the left and right balancers 90a and 90b fastened to the left and right sides of the front surface 31 of the tub 30. Aspects of the present invention are not limited thereto. The balancer 90 may be formed as a single body or as an upper balancer and a lower balancer fastened to the upper side and the lower side on the front surface 31 of the tub 30. Further the balancer may vary in shape or may be disposed at different positions in the tub 30.

The balancer 90 may include a first balancer 90a disposed on the left side of the front surface 31 of the tub 30, and a second balancer disposed on the right side of the front surface 31 of the tub 30. The first balancer 90a and the second balancer 90b may be spaced apart from each other at an upper side and a lower side. The first and second balancers 90a and 90b may be in a shape bilaterally symmetrical about the reference line L passing through the center of the gasket 60, and may be disposed at positions bilaterally symmetrical about the reference line L.

Referring to FIGS. 3 and 4, the pump 901 may include a pump housing 91, a first pump motor 92, a first impeller 915 (see FIG. 19), a second pump motor 93, and a second impeller (not shown).

A water introducing port 911 (see FIG. 19), a circulation port 912, and a drain port 913 may be formed in the pump housing 91. A first chamber 914 (see FIG. 19) for housing the first impeller 915, and a second chamber for housing the second impeller may be formed in the pump housing 91. The first impeller 915 is rotated by the first pump motor 92, and the second impeller is rotated by the second pump motor 93.

The first chamber 914 and the circulation port 912 forms a volute-shaped flow path that is rolled in a direction of rotation of the first impeller 915, and the second chamber and the drain port 913 forms a volute-shaped flow path that is rolled in a direction of rotation of the second impeller. Herein, a direction of rotation of each of the impellers are preset to be controllable by a controller. The controller may include a processor that access a medium storing a program and performs computation according to the stored program. Further, the controller may control not just the pump motors 92 and 93, but also other electronic components included in the washing machine.

The water introducing port 911 is connected to the discharge hose 72, and the first chamber 914 and the second chamber communicate with the water introducing port 911. Water discharged from the tub 30 through the discharge hose 72 is supplied to the first chamber 914 and the second chamber through the water introducing port 911.

The first chamber 914 communicates with the circulation port 912, and the second chamber communicates with the drain port 913. Accordingly, if the first impeller 915 is rotated as the first pump motor 92 operates, water in the first chamber 914 is discharged through the circulation port 912. In addition, if the second pump motor 93 operates, the second impeller is rotated and thereby water in the second camber is discharged through the drain port 913. The circulation port 912 is connected to the circulation pipe 86, and the drain port 913 is connected to the drain pipe 74.

An amount of water to be discharged from (or discharge pressure) of the pump 901 is variable. To this end, the pump motors 92 and 93 are speed-variable motors of which speeds or rotation is controllable. Each of the pump motors 92 and 93 is preferably, but not limited to, a Brushless Direct current Motor (BLDC). A driver for controlling speeds of the pump motors 92 and 93 may be further provided, and the driver may be an inverter driver. The inverter driver inverts AC power into DC power, and inputs the DC power to the motors at a target frequency.

A controller (not shown) for controlling the pump motors 92 and 93 may be further provided. The controller may include a Proportional-Integral (PI) controller, a Proportional-Integral-Derivative (PID) controller), and the like. The controller may receive an output value (e.g., an output current) of a pump motor, and control an output value of the driver based on the received output value of the pump motor so that the number of times of rotation of the pump motor follows a preset target number of times of rotation.

Referring to FIGS. 10, 15, 16, and 17, the gasket 60 may include a casing coupling part 61 coupled to a circumference of the entry hole 12 of the front panel 11, a tub coupling part 62 coupled to a circumference of the opening 31h, and a gasket body 63 extending between the casing coupling part 61 and the tub coupling part 62.

The circumference of the entry hole 12 in the front panel 11 may be rolled outward, and the casing coupling part 61 may be fitted in a concave area formed by the outward rolled portion. An annular groove 61r to be wound by a wire may be formed in the casing coupling part 61. After the wire winds around the groove 61r, both ends of the wire are bound, and therefore, the casing coupling part 61 is tightly fixed to the circumference of the entry hole 12.

The circumference of the entrance hole of the tub 30 is rolled outward, and the tub coupling part 62 is fitted in a concave area formed by the outward rolled portion. An annular groove 62r to be wound by a wire may be formed in the tub coupling part 62. After the wire winds around the groove 62r, both ends of the wire are bound, and therefore, the tub coupling part 62 is tightly coupled to the entrance hole of the tub 30.

While the casing coupling part 61 is fixed to the front panel 11, the tub coupling part 62 is displaceable in accordance with movement of the tub 30. Accordingly, the gasket body 63 needs to be able to transform in accordance with the displacement of the tub coupling part 62. In order to allow the gasket body 63 to transform easily, the gasket 60 may include a folding part 63b between the casing coupling part 61 and the tub coupling part 62, and the folding part 63b is folded as the tub 30 moves in a direction of eccentricity (or a radial direction).

More particularly, an annular rim part 63a extending from the casing coupling part 61 toward the tub coupling part 62 (or toward the rear) is formed in the gasket body 63, and the folding part 63b may be formed between the rim part 63a and the tub coupling part 62.

Meanwhile, the gasket 60 may include an outer door contact part 68 that bends outwardly from the front end of the rim part 63a to be brought into contact with a rear surface 20 of the door 20 in the outside of the entry hole 12 in a state in which the door 20 is closed. In the casing coupling part 61, the above-described groove 61r may be formed at a portion extending from the outer end of the outer door contact part 68.

The gasket 60 may further include an inner door contact part 66 that bends inwardly from the front end of the rim part 63a to be brought into contact with the rear surface of the door 20 in the inside of the entry hole 12 in a state in which the door 20 is closed.

Meanwhile, during rotation, the drum 40 vibrates (which means that the rotation center line C of the drum 40 moves) and, in turn, the center line of the tub 30 (which is approximately identical to the rotation center line C of the drum 40) moves as well. In this case, a moving direction (hereinafter, referred to as an eccentric direction") has a radial direction component.

Figure 17:
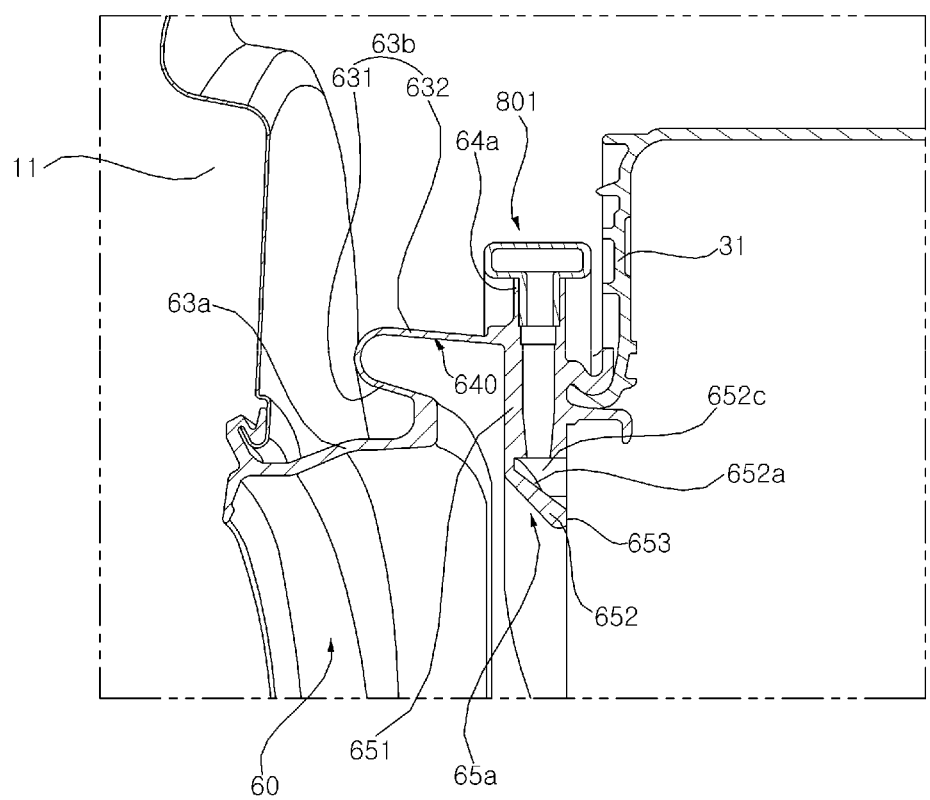
FIG. 17 is a cross-sectional view taken along line IV-IV' in FIG. 9.

The folding part 63b is folded or unfolded when the tub 30 moves in the eccentric direction. The folding part 63b may include an inner circumferential part 631 bent from the rim part 63a toward the casing coupling part 61, and an outer circumferential part 632 bent from the inner circumferential part 631 toward the tub coupling part 32 to be thereby connected to the tub coupling part 62. When viewed from the front, the inner circumferential part 631 is disposed in the inside surrounded by the outer circumferential part 632. As shown in FIG. 17, the rim part 63a and the folding part 63b may form a sectional surface having an approximate "S" shape.

If a portion of the folding part 63b is folded when the center of the tub 30 moves in the eccentric direction, a distance between the inner circumferential part 631 and the outer circumferential part 632 at the portion is reduced, whereas the folding part 62 is unfolded at a portion opposite to the folded portion and thereby a distance between the inner circumferential part 631 and the outer circumferential part 632 at the opposite portion is increased.

When viewed from the front, a plurality of port receiving pipes 64a, 64b, 64c, and 64d may be disposed on the on the left side and/or the right side of the outer circumferential part 632. The port receiving pipes 64a, 64b, 64c, and 64d may protrude outwardly from the outer circumferential part 632. In the present embodiment, two of the port receiving pipes 64a, 64b, 64c, and 64d are disposed on the left side of the outer circumferential part 632, and the other two are disposed on the right side of the outer circumferential part 632. For distinction, such pipes are respectively referred to as a first port receiving pipe 64a, a second port receiving pipe 64b, a third port receiving pipe 64c, and a fourth port receiving pipe 64d.

Specifically, when the gasket body 63 is bilaterally divided into a first area and a right area from a front perspective, the first and second port receiving pipes 64a and 64b are disposed in the first area (e.g., an area on the left side of the reference line L) sequentially from bottom to top, and the third and fourth port receiving pipes 64c and 64d may be disposed in the second area (e.g., an area on the right side of the reference line L) sequentially from bottom to top.

Figure 8:
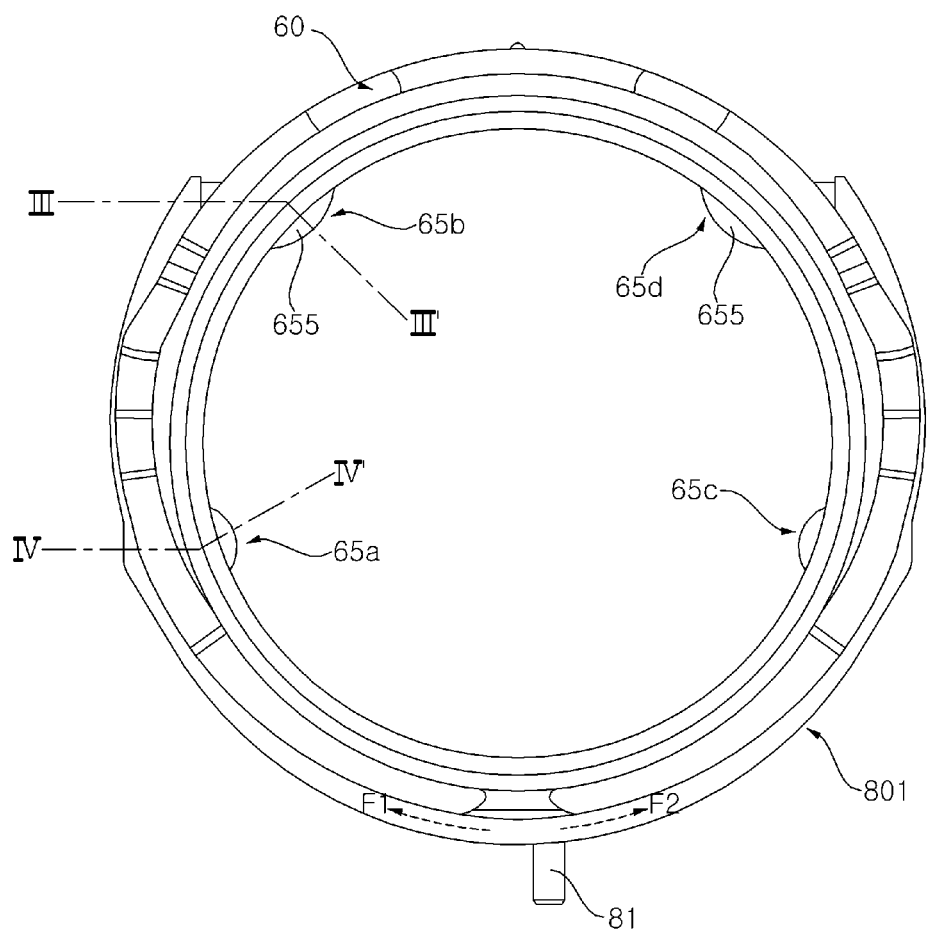
FIG. 8 is a front view of the assembly shown in FIG. 7.
Figure 9:
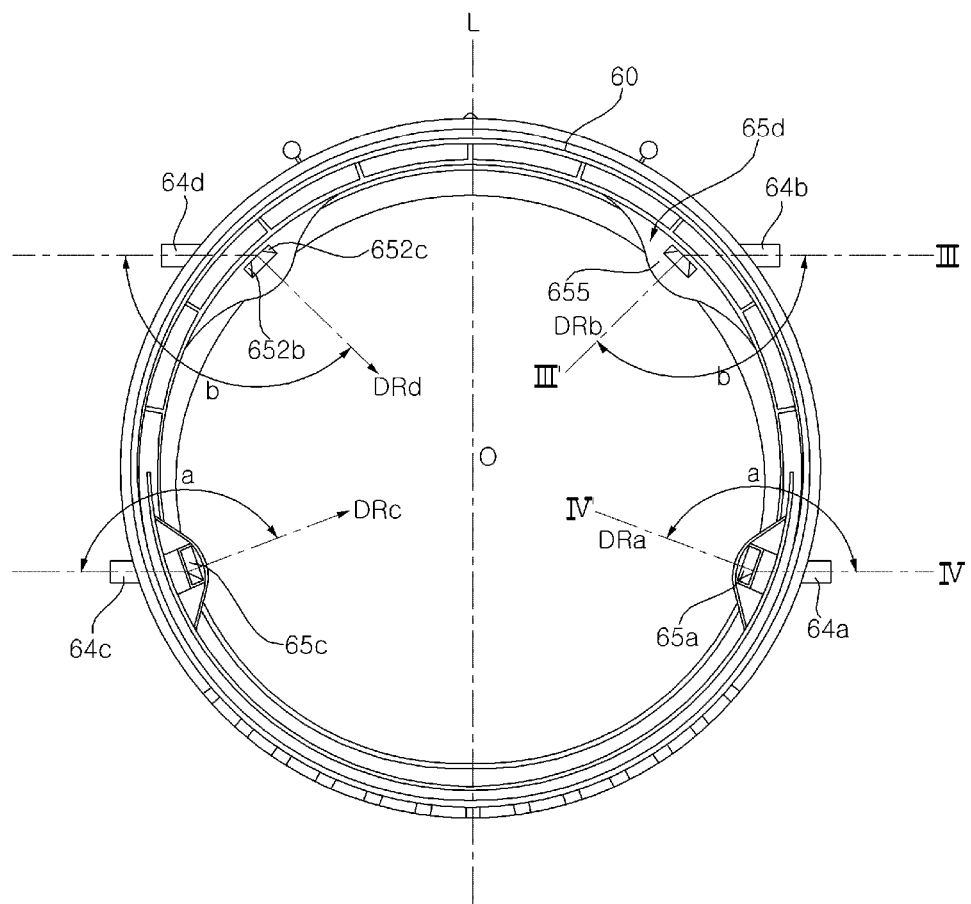
FIG. 9 is a rear view of a gasket.
Figure 10:
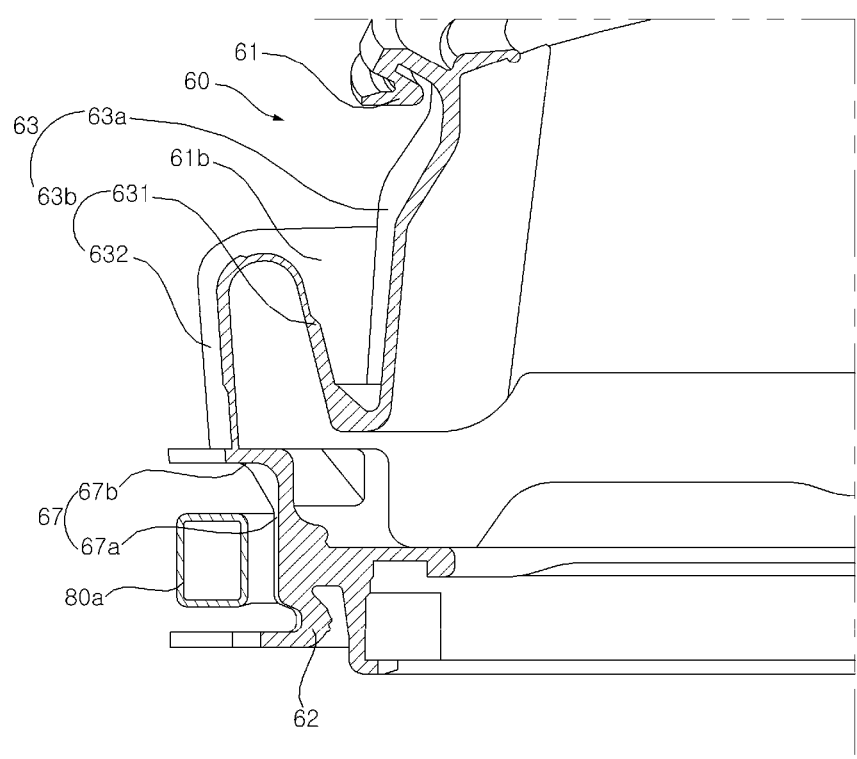
FIG. 10 is a cross-sectional view taken along line A-A' in FIG. 7.

Meanwhile, referring to FIGS. 8 and 9, a plurality of nozzles 65 may be disposed on an inner circumferential surface of the gasket 60. Preferably, the plurality of nozzles 65 may be disposed on an inner circumferential surface of the outer circumferential part 632. In order to correspond to the four port receiving pipes 64a, 64b, 64c, and 64d, there may be provided four nozzles 65a, 65b, 65c, 65d (see FIG. 9). Each of the port receiving pipes 64a, 64b, 64c, and 64d communicates with a corresponding nozzle in the nozzles 65a, 65b, 65c, 65d. That is, a through-hole formed in each of the port receiving pipes 64a, 64b, 64c, and 64d communicates witan entrance hole of a corresponding nozzle in the nozzles 65a, 65b, 65c, 65d.

The second port receiving pipe 64b is disposed above the first port receiving pipe 64a. The first port receiving pipe 64a and the second port receiving pipe 64b may be disposed in parallel with each other. The first port receiving pipe 64a and the second port receiving pipe 64b may extend in a horizontal direction (or a left-and-right direction. Through holes respectively formed in the first port receiving pipe 64a and the second port receiving pipe 64b may extend horizontally and be parallel to each other.

The fourth port receiving pipe 64d is disposed higher than third port receiving pipe 64c. The third port receiving pipe 64c and the fourth port receiving pipe 64d may be disposed parallel to each other. The third port receiving pipe 64c and the fourth port receiving pipe 64d may extend in a horizontal direction (or a left-right direction). Through-holes respectively formed in the third port receiving pipe 64c and the fourth port receiving pipe 64d may extend horizontally and may be parallel to each other.

Referring to FIG. 9, a residual water discharge port 69 (see FIG. 20) for draining wash water stagnating in the gasket 60 may be provided at the bottom of the outer circumferential part 632. The residual water discharge port 69 may protrude downward from the outer circumferential surface of the outer circumferential part 632. Through the residual water discharge port 69, wash water stagnating in the folding part 63b may be drained.

Figure 14:
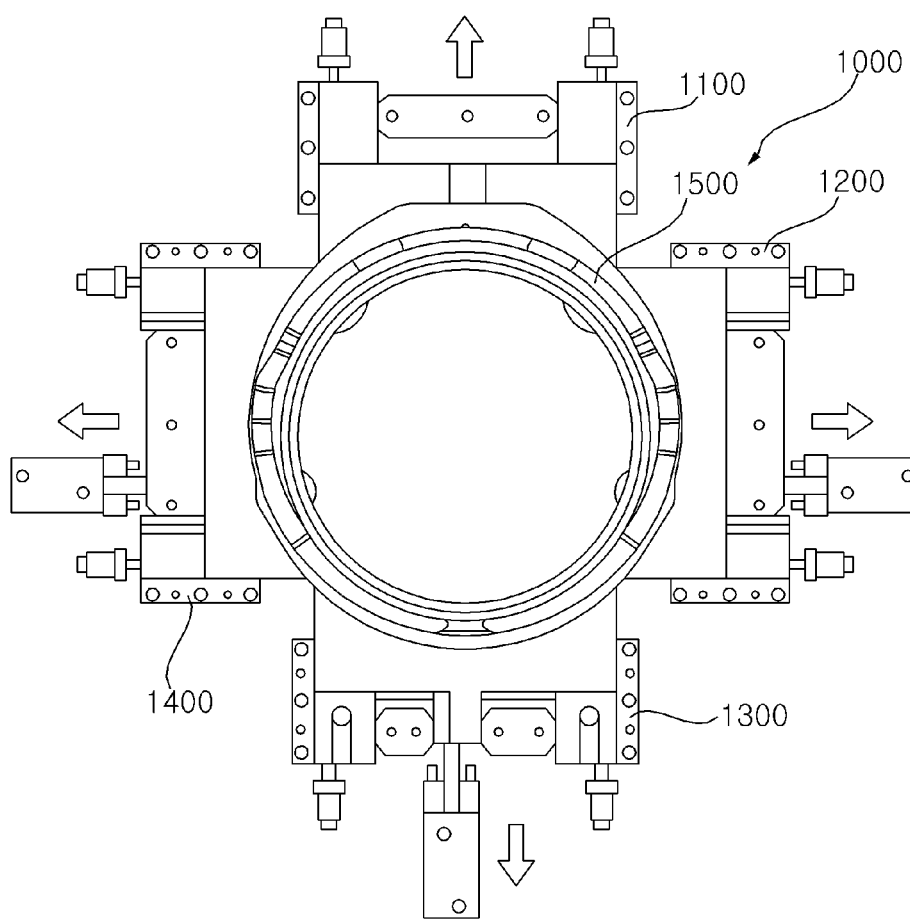
FIG. 14 is a plan view of an injection mold for manufacturing a gasket according to an embodiment of the present invention.

Meanwhile, the gasket 60 may be fabricated using an injection molding machine 1000. Specifically, referring to FIG. 14, the injection molding machine 1000 includes a fixed mold 1500, and movable molds 1100, 1200, 1300, and 1400 capable of moving relative to the fixed mold 1500. The movable molds 1100, 1200, 1300, and 1400 may include a first movable mold 1100, a second movable mold 1200, a third movable mold 1300, and a fourth movable mold 1400.

Molten synthetic resin discharged from an injection machine (not shown) is injected into a cavity that is formed by the fixed mold 1500, the first movable mold 1100, the second movable mold 1200, the third movable mold 1300, and the fourth movable mold 1400.

The fixed mold 1500 may be disposed at the center, and the first movable mold 1100, the second movable mold 1200, the third movable mold 1300, and the fourth movable mold 1400 may be disposed on a circumference of the fixed mold 1500. When the molds are opened up, the first movable mold 1100 moves in a forward direction (the upward direction in FIG. 14) from the fixed mold 1500, the second movable mold 1200 moves in a rightward direction from the fixed mold 1500, the third movable mold 1300 moves in a rearward direction (the downward direction in FIG. 14) from the fixed mold 1500, and the fourth movable mold 1400 moves in a leftward direction from the fixed mold 1500.

The residual water discharge port 69 disposed in a lower side of the gasket 60 may be molded by the third movable mold 1300. Since the residual water discharge port 69 extends in the moving direction of the third movable mold 1300, mold stripping may be performed smoothly.

The first port receiving pipe 64a and the second port receiving pipe 64b disposed on the left side of the gasket 60 may be molded by the fourth movable mold 1400. The fourth movable mold 1400 may move in the left direction, and the first port receiving pipe 64a and the second port receiving pipe 64b may protrude in a direction identical to the moving direction (that is, the left direction) of the fourth movable mold 1400.

The first port receiving pipe 64a and the second port receiving pipe 64b may be disposed in parallel with each other. In other words, a direction in which the first port receiving pipe 64a protrudes from the outer circumferential surface of the outer circumferential part 632 may be identical to a direction in which the second port receiving pipe 64b protrudes from the outer circumferential surface of the outer circumferential part 632.

The third port receiving pipe 64c and the fourth port receiving pipe 64d disposed on the right side of the gasket 60 may be molded by the second movable mold 1200. The second movable mold 1200 may move in the right direction, and the third port receiving pipe 64c and the fourth port receiving pipe 64d may protrude in a direction identical to the moving direction (that is, the right direction) of the second movable mold 1200.

The third port receiving pipe 64c and the fourth port receiving pipe 64d may be disposed in parallel with each other. In other words, a direction in which the third port receiving pipe 64c protrudes from the outer circumferential surface of the outer circumferential part 632 may be identical to a direction in which the fourth port receiving pipe 64d protrudes from the outer circumferential surface of the outer circumferential part 632.

Since the first movable mold 1100, the second movable mold 1200, the third movable mold 1300, and the fourth movable mold 1400 move in different directions (or the first movable mold 1100 and the third movable mold 1300 moves in different directions and the second movable mold 1200 and the fourth movable mold 1400 move in different directions), receiving pipes or ports may be formed on the upper side, the left side, the right side, and the lower side of the gasket 60, respectively.

The gasket body 63 may be symmetrical about the symmetry reference line L. The first port receiving pipe 64a and the third port receiving pipe 64c may be disposed at the same height. The second port receiving pipe 64b and the fourth port receiving pipe 64d may be disposed at the same height. The first port receiving pipe 64a and the third port receiving pipe 64c may be in a vertically symmetrical structure which is a structure symmetrical about the symmetry reference line L. Likewise, the second port receiving pipe 64b and the fourth port receiving pipe 64d may be in a vertically symmetrical structure.

Meanwhile, referring to FIG. 9, a width of the rim part 63a may gradually increase in the upward direction (or a front-and-back direction). In this case, in response to the increasing width of the inner circumferential part 631, the outer circumferential part 632 is positioned further rearward in the upward direction. Accordingly, the third port receiving pipe 64c is closer to the tub 30 than the fourth port receiving pipe 64d, and the first port receiving pipe 64a is closer to the tub 30 than the second port receiving pipe 64b.

Referring to FIGS. 5, 6, 7, and 18, there may be provided a plurality of nozzles 65a, 65b, 65c, 65d that discharges circulating water into the drum 40. The plurality of nozzles 65a, 65b, 65c, 65d are respectively connected to the first port receiving pipe 64a, the second port receiving pipe 64b, the third port receiving pipe 64c, and the fourth port receiving pipe 64d. Hereinafter, a nozzle communicating with the first port receiving pipe 64a to receive circulating water is referred to as a first nozzle 65a, a nozzle communicating with the second port receiving pipe 64b to receive circulating water is referred to as a second nozzle 65b, a nozzle communicating with the third port receiving pipe 64c to receive circulating water is referred to as a third nozzle 65c, and a nozzle communicating with the fourth port receiving pipe 64d to receive circulating water is referred to as a fourth nozzle 65d.

As described above, the plurality of port receiving pipes 64a, 64b, 64c, and 64d extends horizontally, and a plurality of outlet ports 84 (84a, 84b, 84c, and 84d) described in the following extends horizontally as well to correspond to the plurality of port receiving pipes 64a, 64b, 64c, and 64d. Accordingly, circulating water is supplied or guided by each of the outlet ports 84a, 84b, 84c, and 84d in a horizontal direction.

The nozzles 65a, 65b, 65c, 65d may be configured to discharge circulating water, supplied in the horizontal direction as described above, in a direction that forms a predetermined angle relative to the horizontal direction. That is, although circulating water is supplied in the horizontal direction through each of the outlet ports 84a, 84b, 84c, and 84d or the port receiving pipes 64a, 64b, 64c, and 64d, a direction in which each of the nozzles 65a, 65b, 65c, 65d discharges the circulating water may be upward or downward at a predetermined angle relative to the horizontal direction.

Figure 18:
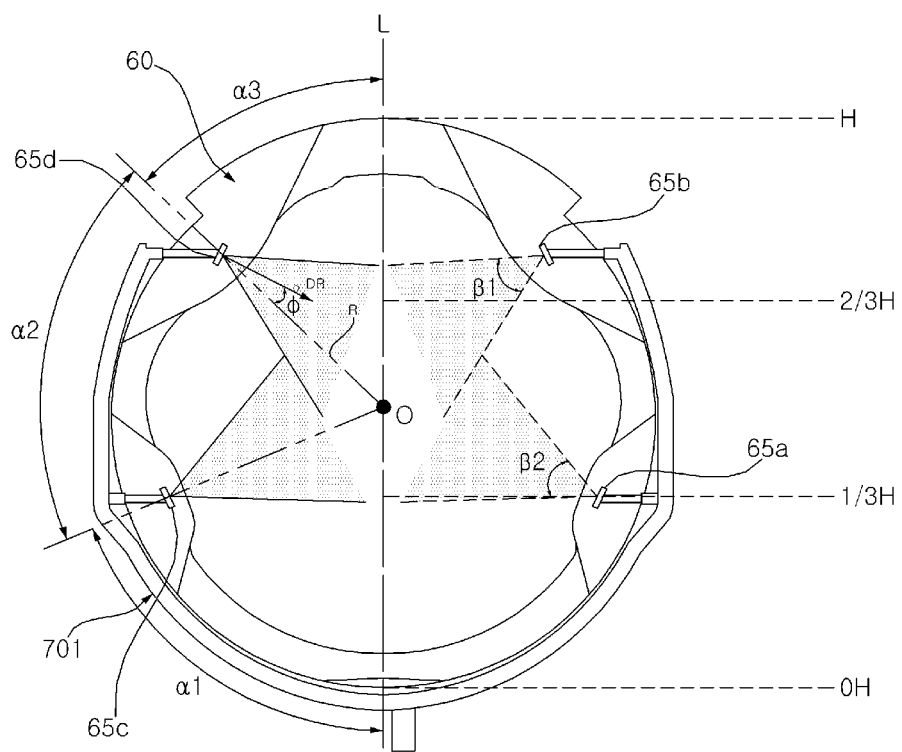
FIG. 18 illustrates an assembly of a gasket and a distribution pipe and particularly positions of nozzles and a spray width of each nozzle.

FIG. 18 illustrates an assembly of a gasket and a distribution pipe and particularly positions of nozzles and a spray width of each nozzle. Referring to FIG. 18, as described above, four nozzles 65 may be provided in the gasket 60. Hereinafter, two nozzles 65b and 65d at upper positions in the four nozzles 65 are referred to as upper nozzles 65b and 65d. When viewed from the front, the left nozzle in the upper nozzles 65b and 65d is referred to as a first upper nozzle 65b and the right nozzle in the upper nozzles 65b and 65d is referred to as a second upper nozzle 65d.

The upper nozzles 65b and 65d are located higher than the center O of the gasket 60 to thereby spray circulating water downward. Here, the center O is a predetermined point located on the symmetry reference line L of the gasket 60. The center O is preferably located at a half the height H of the gasket 60, but aspects of the present invention are not limited thereto.

When viewed from the front, the first upper nozzle 65b is disposed in the left area of the reference line L to thereby spray circulating water downward toward the right area of the reference line. When viewed from the front, the second upper nozzle 65d is disposed in the right area of the reference line L to thereby spray circulating water downward toward the left area of the reference line L.

The first upper nozzle 65b and the second upper nozzle 65d may be vertically symmetrical about the reference line L. Accordingly, the form of water streams sprayed through the first upper nozzle 65b and the second upper nozzle 65d are symmetrical about the reference line L.

In addition, two nozzles positioned below the upper nozzles 65a and 65c are referred to as lower nozzles 65b and 65d. When viewed from the front, the left one in the lower nozzles 65a and 65c is referred to as a first lower nozzle 65a and the right one in the lower nozzles 65a and 65c is referred to as a second lower nozzle 65c.

When viewed from the front, the first lower nozzle 65a is disposed in the left area of the reference line L to thereby spray circulating water upward toward the right area of the reference line L.

When viewed from the front, the second lower nozzle 65c is disposed in the right area of the reference line L to thereby spray circulating water upward toward the left area of the reference line L.

The first lower nozzle 65a and the second lower nozzle 65c may be vertically symmetrical about the reference line L. Accordingly, the form of water streams sprayed through the first lower nozzle 65a and the second lower nozzle 65c are symmetrical about the reference line L.

Figure 15:
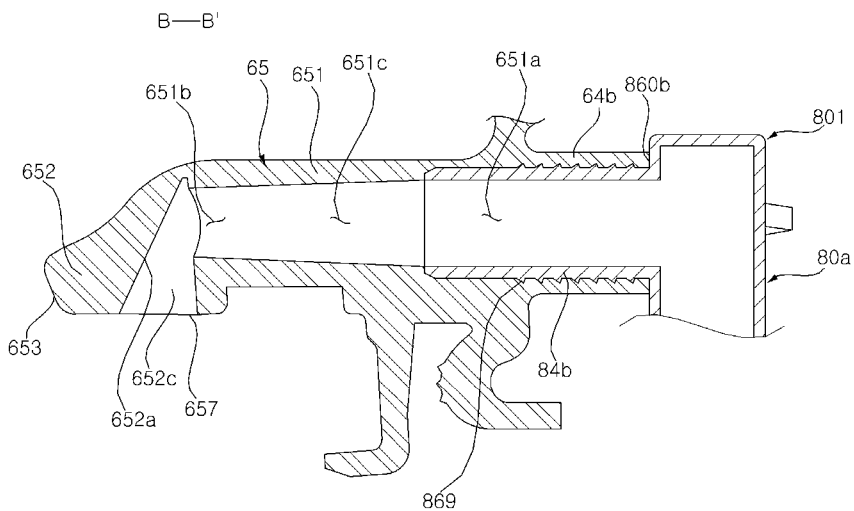
FIG. 15 is a cross-sectional view taken along line B-B' in FIG. 7.
Figure 16:
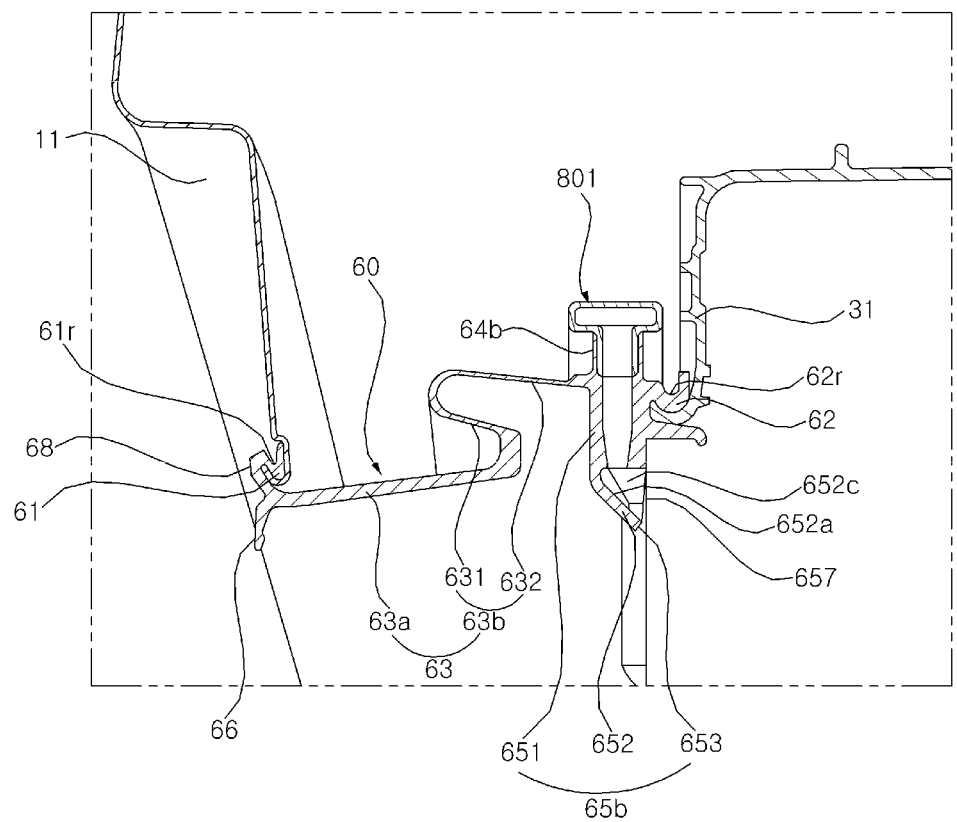
FIG. 16 is a cross-sectional view taken along line III-III' in FIG. 9.

Referring to FIGS. 15, 16, and 17, the nozzle 65a may be formed in the gasket body 63 of the gasket 60 and preferably protrude from the inner circumferential surface of the outer circumferential part 632. The nozzle 65a may include a nozzle conduit 651 and a nozzle head 652. Specifically, the nozzle conduit 651 is in an annular shape and connected to the nozzle head 652 protruding from the inner circumferential surface of the outer circumferential part 632.

The nozzle head 652 may include a collision surface 652a with which water discharged from the outlet port 84 collides, and a first side surface 652b (see FIG. 9) and a second side surface 652c, which are disposed on both sides of the collision surface 652a. A cone-shaped space is formed by the collision surface 652a, the first side surface 652b, and the second side surface 652c, and water discharged from the nozzle conduit 651 collides with the collision surface 652a in the space and is then discharged through a spray hole 657.

The first side surface 652b and the second side surface 652c extend from the left edge and the right edge of the collision surface 652, respectively, and define the left and right boundaries of a water stream flowing along the collision surface 652a.

An angle $\gamma$ formed by the first side surface 652b and the second side surface 652c is approximately between 45° and 55° and preferably 50°, but aspects of the present invention are not limited thereto.

If a spray width of each water stream sprayed through the nozzles 65 is defined by a spray width angle, the spray width angle may be defined by the first side surface 652b and the second side surface 652c. Specifically, the spray width angle may be defined as an angle formed by a first boundary, where the collision surface 652a and the first side surface 652b meet, and a second boundary, where the collision surface 652a and the second side surface 652c meet.

Referring to FIG. 17, a spray width angle $\beta1$ for the upper nozzles 65b and 65d may be smaller than a spray width angle $\beta2$ for the lower nozzles 65a and 65c. While water supplied through an inlet port 81 rises along a distribution pipe 801, some of the circulating water is sprayed through the lower nozzles 65a and 65c and the rest of the circulating water is sprayed through the upper nozzles 65b and 65d. Thus, an amount of water discharged through the upper nozzles 65b and 65d is less than an amount of water discharged through the lower nozzles 65a and 65c. Accordingly, if the spray width of the upper nozzles 65b and 65d is set to be smaller than the spray width of lower nozzles 65a and 65c ($\beta1<\beta2$) to thereby relatively compensate for discharge pressure of the upper nozzles 65b and 65d, water may be discharged from all of the nozzles 65a, 65b, 65c, 65d with substantially uniform discharge pressure.

A difference $\beta2-\beta1$ between the spray width angle $\beta2$ for the lower nozzles 65a and 65c and the spray width angle $\beta1$ for the upper nozzles 65b and 65d may be approximately between 4° and 6° and preferably 5°. In this case, $\beta1$ is approximately between 38° and 42° and preferably 40°, and $\beta2$ is approximately between 43° and 47° and preferably 45°.

Meanwhile, a spray direction for each upper nozzle 65b and 65d may form an upward deviation angle $\phi$ relative to a line R that connects each of the upper nozzles 65b and 65d and the center O of the gasket 60 (which is referred to as a "nozzle alignment line"). Here, a spray direction DR of each upper nozzle 65b and 65d is defined along a straight line equally dividing the angle formed by the first side surface 652b and the second side surface 652c, and the spray direction DR is higher than the nozzle alignment line R. The upward deviation angle $\phi$ may be between 5° and 9° and preferably 7°.

Due to various conditions such as a height, a position, and the spray width angle $\beta1$ of each of the upper nozzles 65b and 65d, water may not be sprayed with sufficient pressure through each upper nozzle 65b and 65d and thus a sprayed water stream cannot travel a long distance in a straight line. For this reason, the spray direction of each upper nozzle 65b and 65d is set to be higher by the upward deviation angle $\phi$ than the nozzle alignment line R, so that a water stream is able to reach an area which the nozzle alignment line R passes through even when discharge pressure for each upper nozzle 65b and 65d is not sufficient. Preferably, as shown in FIG. 17, the form of a water stream sprayed through each upper nozzle 65b and 65d may be substantially horizontally symmetrical to the form of a water stream sprayed through each of the lower nozzles 65a and 65c.

Meanwhile, in the case where an angle from the lowest point in the gasket 60 to each of the lower nozzles 65a and 65c is $\alpha1$, each of the upper nozzle 65b and 65d is disposed between a position corresponding to the angle $\alpha1$ and the highest point H in the gasket 60, and each upper nozzle 65a or 65c may be disposed higher than a point corresponding to an angle calculated by equally dividing 180-$\alpha1$. That is, in FIG. 17, $\alpha2$ has a value greater than $\alpha3$. A value of $\alpha2-\alpha3$ may be between 18° and 22° and preferably 20°. In this case, $\alpha2$ may be between 63° and 67° and preferably 65°.

Meanwhile, each of the lower nozzle 65a and 65c may be located at a one-third ($\frac{1}{3}$H) point of the height H of the gasket 60. In this case, it is preferable that $\alpha2$ is set within a range where each of the upper nozzle 65b and 65d is located higher than a two-third (⅔H) point of the height of the gasket 60, and, at this point, α2 may be 65°.

In order to spray circulating water evenly upward and downward in the drum, it is preferable that the upper nozzles 65b and 65d and the lower nozzles 65a and 65c are disposed at an equal interval in a height direction. In this case, however, water streams sprayed from the upper nozzles 65b and 65d are sprayed downward due to the gravity, and there is a problem that the water stream actually reaches an area further downward than geometrically predicted. Therefore, considering that the water streams moving further downward due to gravity, the upper nozzles 65b and 65d need to be disposed at a point higher than the ⅔H point.

Meanwhile, when circulating is sprayed through the lower nozzles 65a and 65c upon operation of the pump 901, it is preferable that a water level of the tub 30 does not exceed the ⅓H point.

Meanwhile, referring to FIG. 9, when viewed from the front, a spray direction DRa of the lower nozzle 65a may form an angle a relative to a length direction of the port receiving pipe 64a (or a direction in which water is introduced into the nozzle 65a, that is, a water-introducing direction).

Since the nozzle 65a and the nozzle 65c are arranged symmetrically, an angle formed by a spray direction DRc of the nozzle 65c relative to the port receiving pipe 64c is also the angle α.

In addition, when viewed from the front, a spray direction DRb of the upper nozzle 65b may form an angle b a relative to a length direction of the port receiving pipe 64b (or a direction in which water is introduced into the nozzle 65b, that is, a water-introducing direction). Here, the angle b may be between 133° and 135°. The angle b may be smaller the angle α.

Since the nozzle 65b and the nozzle 65d are arranged symmetrically, an angle formed by a spray direction DRd of the nozzle 65d relative to the port receiving pipe 64d is also the angle b.

Meanwhile, the nozzle conduit 651 extends horizontally to thereby guide water in a horizontal direction. Accordingly, since a water stream travels in a constant direction without influence of the gravity before reaching the nozzle head 652 and is then dispersed by the collision surface 652a, water may be sprayed in a uniform form from each of the nozzles 65a, 65b, 65c, 65d.

If the length direction of the nozzle conduit 651 is not arranged approximately horizontally but arranged toward the center O of the gasket 60, the weight of gravity acts on downward movement of water flowing in the nozzle conduit 651 of each of the upper nozzles 65b and 65d, and thus, this water may be sprayed faster than water sprayed from each of the lower nozzles 65a and 65c. Also, the weight of gravity acts on upward movement of water flowing in the nozzle conduit 651 of each of the lower nozzles 65a and 65c, and thus, this water may be sprayed slower than the water sprayed from each upper nozzle 65b and 65d. For this reason, it is difficult that water sprayed from the plurality of nozzles 65a, 65b, 65c, 65d into the drum 40 have a uniform form. On the contrary, in the present embodiment, the length direction of the nozzle conduit 651 is arranged approximately horizontally, and thus, water sprayed from the plurality of nozzles 65a, 65b, 65c, 65d into the drum 40 may have a uniform form.

Meanwhile, an entrance hole 651a of the nozzle conduit 651 may be larger in size than the exit hole 651b. Circulating water discharged from the exit hole 651b hits the collision surface 652a of the nozzle head 652 and is then sprayed into the drum 40 through the spray hole 657. A direction in which the spray hole faces and the length direction of the nozzle conduit 651 may intersect each other.

The gasket 60 may include a protruding part 655 protruding from the inner circumferential surface of the gasket body 63. To correspond to the plurality of nozzles 65a, 65b, 65c, and 65d, a plurality of protruding parts 655 may be formed along a circumferential direction. A spray hole 657 of each of the nozzles 65a, 65b, 65c, and 65d may be formed in a corresponding protruding part 655 (see FIG. 9).

Referring to FIG. 15, the nozzle conduit 651 may include a flow path reducing portion 651c in which an inner dimeter is gradually reduced in a direction of travel of water. The inner diameter of the flow path reducing portion 651c may be gradually reduced until the nozzle head 652.

Meanwhile, at least a portion of the distribution pipe 801 may be disposed between the outer circumferential surface of the gasket 60 and a balancer 90a and 90b. The distribution pipe 801 may be installed in an existing space (that is, a space between the outer circumferential surface of the gasket 60 and the balancer 90a and 90b), without need for an additional space for the installation.

The pair of the upper nozzles 65b and 65d may be formed higher than the inlet port 81, and arranged on the left and right sides of the inlet port 81, respectively. The pair of the upper nozzles 65b, 65d are disposed symmetrically about the reference line L passing through the center O (see FIG. 9), and thus, spray directions of the respective upper nozzles 65b, 65d are also symmetrical about the reference line L.

The pair of the upper nozzles 65b and 65d may be disposed higher than the center O or the center C of the drum 40. The respective upper nozzles 65b and 65d spray circulating water downward, so, when the drum 40 is viewed from the front, circulating water is sprayed in a manner of passing through an area higher than the center C of the drum 40 at the entrance hole of the drum 40 and traveling in a direction inclined downward toward an area deep inside the drum 40.

The pair of the lower nozzles 65a and 65c is disposed higher than the inlet port 81 but lower than the pair of the upper nozzles 65b and 65d. The pair of the lower nozzles 65a and 65c may be disposed on the left and right sides with reference to the inlet port 81, respectively. Preferably, the pair of the lower nozzles 65a and 65c are disposed symmetrical about the reference line so that spray directions of the respective lower nozzles 65a and 65c are symmetrical about the reference line L.

The pair of the lower nozzles 65a and 65c may be disposed lower than the center O or the center C of the drum 40. The respective lower nozzles 65a and 65c spray circulating water upward, so, when the drum 40 is viewed from the front, circulating water is sprayed in a manner of passing through an area lower than the center C of the drum 40 at the entrance hole of the drum 40 and traveling in a direction inclined upward toward an area deep inside the drum 40.

Referring to FIG. 17, take an example of the first nozzle 65a. One end of the nozzle conduit 651 communicates with the first port receiving pipe 64a, and the other end thereof is open inside the tub 30. One end of the nozzle conduit 651 has a sectional area smaller than that of the other end. A through hole 651a is formed inside the nozzle conduit 651.

The nozzle head 652 interferes with sprayed circulating water and changes a spray direction of the circulating water. The nozzle head 652 sprays the circulating water toward an inner portion of the rear side of the tub 32.

The other end 653 of the nozzle head 652 is spaced apart from a discharge side (the other side) of the nozzle conduit 651. Spaced apart from the other end of the nozzle conduit 651, the nozzle head 652 is disposed to hide the nozzle conduit 651. Circulating water hits an inner surface of the nozzle head 652, thereby changing a direction to be discharged. The other end 653 of the nozzle head 652 is disposed to face the rear of the tub 30.

Circulating water discharged through a discharge hole 651c of the nozzle conduit 651 hits the collision surface 652a of the nozzle head and is then sprayed into the tub 30 through the spray hole 657. A direction in which the spray hole 657 faces intersect with a direction in which the nozzle conduit 651 extends.

Figure 6:
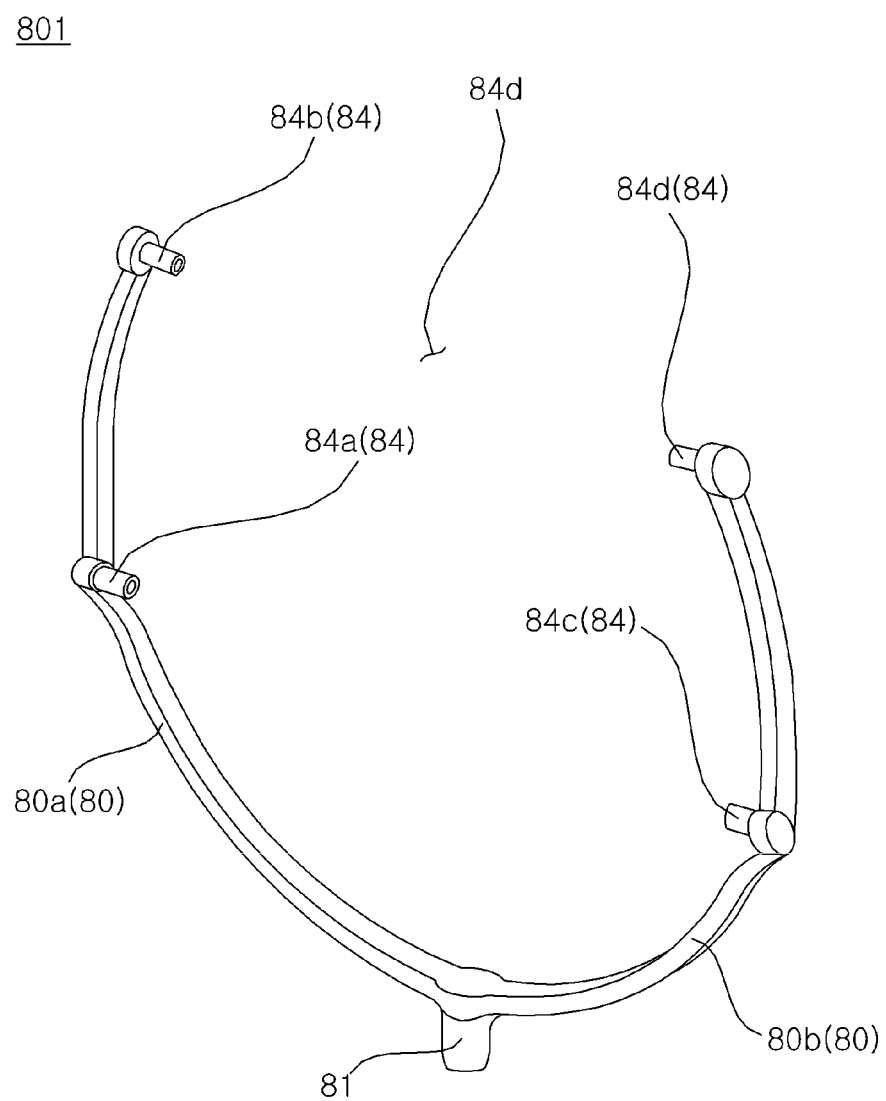
FIG. 6 is a perspective view of a distribution pipe shown in FIG. 4.
Figure 7:
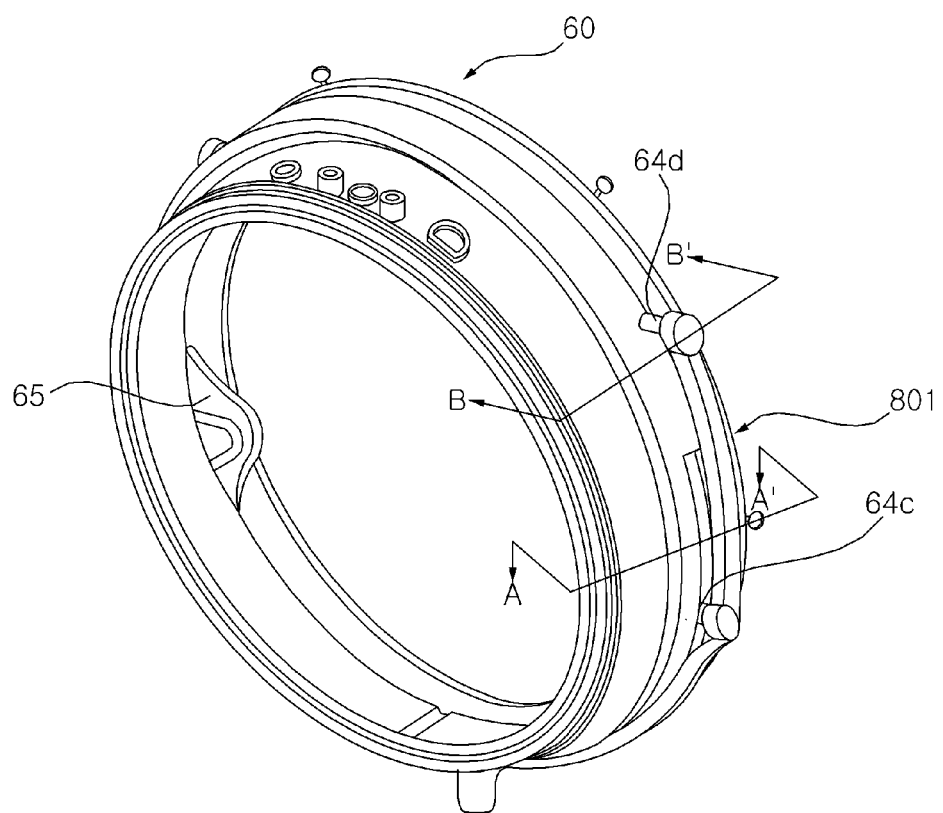
FIG. 7 is a perspective view illustrating an assembled state of a gasket and a distribution pipe.

Referring to FIG. 6, the distribution pipe 801 includes the inlet port 81 connected to a circulation pipe 86, a transport conduit 80 guiding water introduced through the inlet port 81, and a plurality of outlet ports 84a, 84b, 84c, and 84d protruding from the transport conduit 80.

Figure 13:
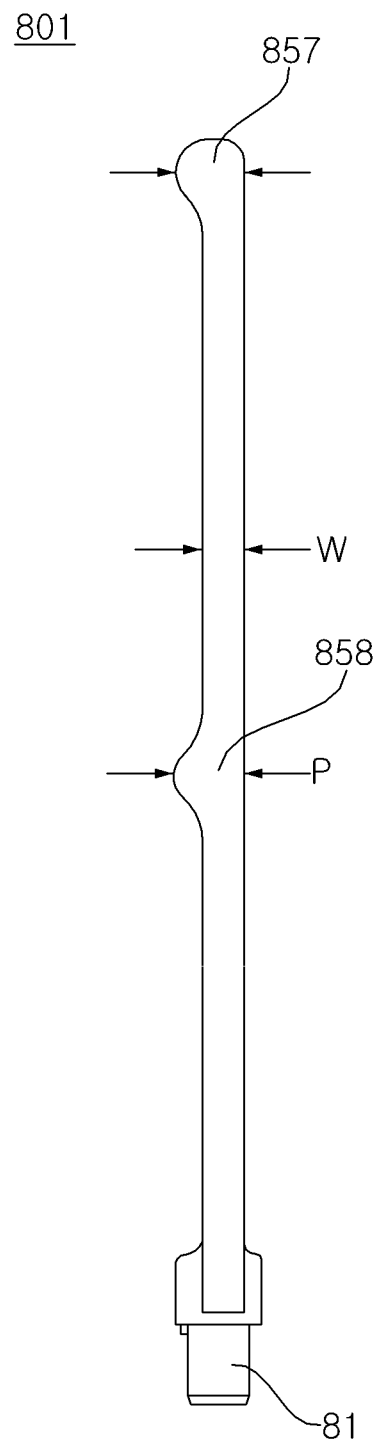
FIG. 13 is a side view of a distribution pipe shown in FIG. 11.

The distribution pipe 801 branches circulating water discharged from the circulation pipe 86 to thereby form a first sub-flow FL1 (see FIG. 13) and a second sub-flow FL2 (see FIG. 13). In the distribution pipe 801, at least one outlet port 84b or 84c is formed in a first flow path through which the first sub-flow FL1 is guided, so that circulating water is discharged through a corresponding outlet port 84b or 84c toward a corresponding nozzle 65b or 65c. Likewise, at least one outlet port 84d is formed in a second flow path through which the second sub-flow FL2 is guided, so that circulating water is discharged through a corresponding outlet port 84d toward a corresponding nozzle 65d. The transport conduit 80 may include a first conduit part 80a forming the first flow path, and a second conduit part 80b forming the second flow path.

One end of the first conduit part 80a and one end of the second conduit part 80b are connected to each other, and the inlet port 81 protrudes in the connected portion. However, the other end of the first conduit part 80a and the other end of the second conduit part 80b are separated from each other. That is, the transport conduit 80 generally has a "Y" shape to thereby branch circulating water introduced through one entrance hole (that is, the inlet port 81) into two flow paths.

The nozzles 65a, 65b, 65c, 65d may be classified as the upper nozzles 65b and 65d and the lower nozzles 65a and 65c by heights thereof on the gasket 60. In the present embodiment, four nozzles 65a, 65b, 65c, 65d are provided. The four nozzles 65a, 65b, 65c, 65d may include the first lower nozzle 65a and the second lower nozzle 65c disposed in the lower part of the gasket 60, and the first upper nozzle 65b and the second upper nozzle 65d, which are disposed higher than the lower nozzles 65b and 65d.

The outlet ports 84a, 84b, 84c, and 84d are provided in a number corresponding to the number of the nozzles 65a, 65b, 65c, 65d, and each of the outlet ports 84a, 84b, 84c, and 84d supplies circulating water to a corresponding nozzle in the nozzles 65a, 65b, 65c, 65d.

The outlet ports 84a, 84b, 84c, and 84d may include a first upper outlet port 84b supplying circulating water to the first upper nozzle 65b, a second upper outlet port 72d supplying circulating water to the second upper nozzle 65d, a first lower outlet port 84a supplying circulating water to the first lower nozzle 65a, and a second lower outlet port 84c supplying circulating water to the second lower nozzle 65c.

The transport conduit 80 is disposed in a circumference of the outer circumferential part of the gasket 60, and connected to a pump 901 via the circulation pipe 86. The respective outlet ports 84a, 84b, 84c, and 84d protrudes inwardly from the transport conduit 80 along a radial direction and are inserted into the gasket 60 to thereby supply circulating water to the corresponding nozzles 65a, 65b, 65c, 65d.

The distribution pipe 801 may include the inlet port 81 that protrudes from the transport conduit 80 to be connected to the circulation pipe 86. The inlet port 81 may protrude outwardly from the transport conduit 80 along the radial direction.

Figure 11:
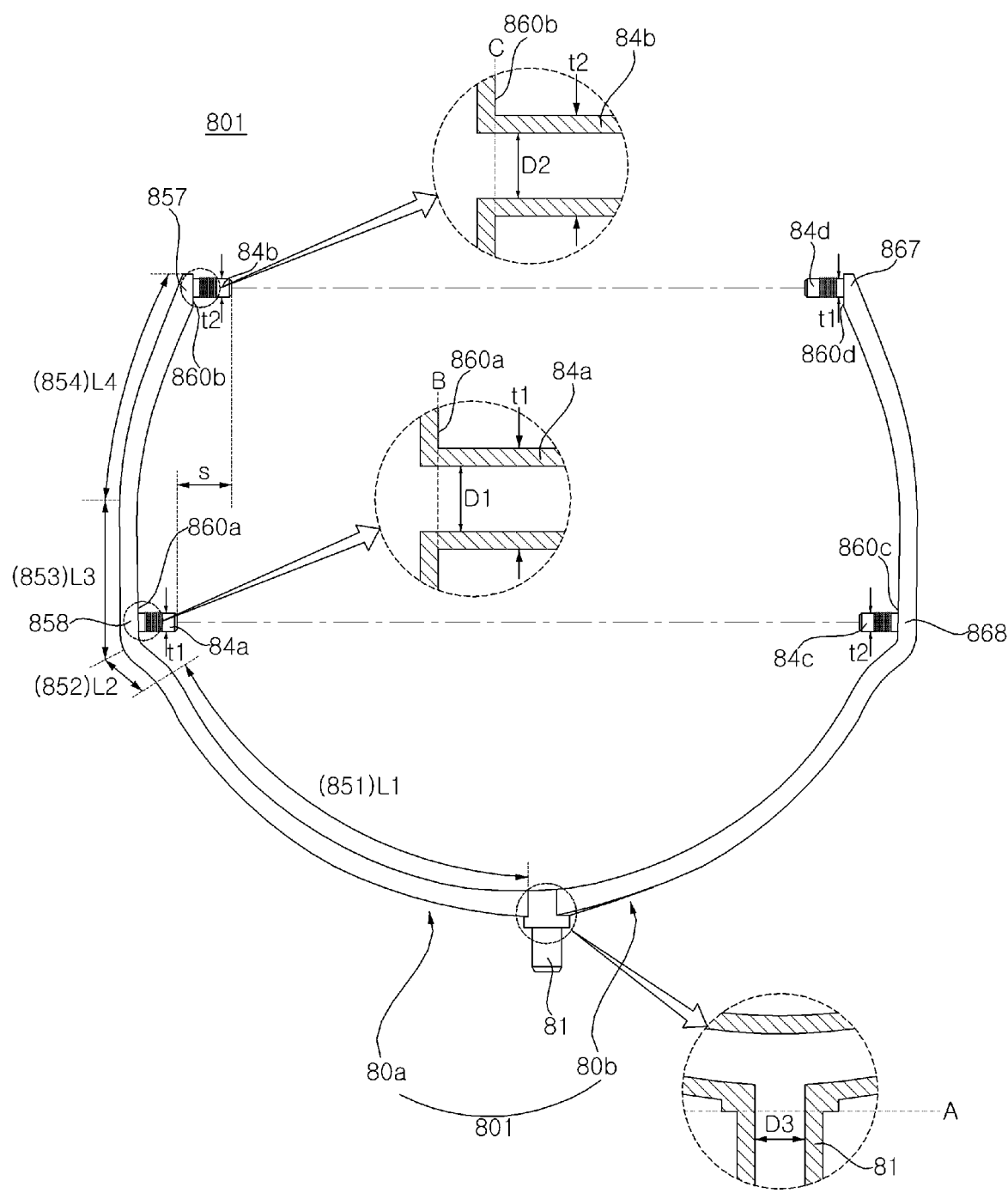
FIG. 11 is a front view of a distribution pipe.

FIG. 11 is a front view of a distribution pipe. Referring to FIG. 11, the first conduit part 80a may include a first section 851, a second section 852, a third section 853, and a fourth section 854. The second conduit part 80b has a shape symmetrical to the first conduit part 80a and have the configuration substantially identical to that of the first conduit part 80a. Therefore, the following description about the first conduit part 80a may apply even to the second conduit part 80b.

The first section 851 extends from the inlet port 81. The first section 851 is an arc-shaped section that extends at a predetermined curvature. In the present embodiment, the first section 851 is a curved line having an approximately predetermined curvature, but aspects of the present invention are not limited thereto. In some embodiments, the first section 851 may be in a shape in which two or more curved lines having different curvatures are connected.

The second section 852 may continue from the first section 851 and have a shape spreading outwardly from the first section 851. In other words, the second section 852 corresponds to a portion that is bent outwardly (that is, a direction distal from the center O) from the top end of the first section 851 and extends by a distance L2. The length L2 of the second section 852 may be shorter than a length L1 of the first section 851.

The third section 853 is a portion that is bent inwardly (that is, a direction proximal to the center O) from the second section 852 and extends by a distance L3. The third section 853 may extend substantially vertically upward from the second section 852. The lower outlet port 84b may be formed in the third section 853 and extend in a horizontal direction (or a direction orthogonal to the second section 852).

In the third section 853, a first flat surface 860a where the lower outlet port 84b protrudes may be formed flat. The first flat surface 860a may extend in the vertical direction. At least a portion of the first flat surface 860a may be brought into contact with the outer surface of the gasket body 63. Further, an end portion of the port receiving pipe 64a may be tightly brought into contact with the first flat surface 860a.

The fourth section 854 is bent inwardly (that is, in a direction proximal to the enter O) from the third section 853 and further extends by a distance L4 to thereby reach an end portion of the first conduit part 80a. The upper outlet port 84b may be formed in the fourth section 854 and preferably at an end portion of the fourth section 854 as shown in the present embodiment. The fourth section 854 may be in the shape of a curved line having a predetermined curvature, and may extend in a direction intersecting with a length direction of the upper outlet port 84b.

At an end portion of the first conduit part 80a (or an end portion of the fourth section 854, a second flat surface 860b where the upper outlet port 84b protrudes may be formed flat. The second flat surface 860b may extend in the vertical direction. In this case, the first flat surface 860a and the second flat surface 860b are parallel to each other. At least a portion of the second flat surface 860b may be brought into contact with an end portion of the port receiving pipe 64b.

Meanwhile, since the fourth section 854 is in the shape bent inwardly from the third section 853, the second flat surface 860b where the upper outlet port 84b is formed is, when viewed from the front, disposed closer to the symmetry reference line L than the first flat surface 860a where the lower outlet port 84a is formed. Further, it is preferable that the second flat surface 860b is closer to the outer surface of the gasket body 63 than the first flat surface 860a.

Meanwhile, in FIG. 11, reference numeral 860c indicates a flat surface from which the lower outlet port 84c protrudes, and reference numeral 860d is a flat surface from which the upper outlet port 84d protrudes.

In addition, when viewed from the front, an end portion of the upper outlet port 84b is disposed at a location closer by a distance S to the symmetry reference line L than an end portion of the lower outlet port 84a.

Figure 12:
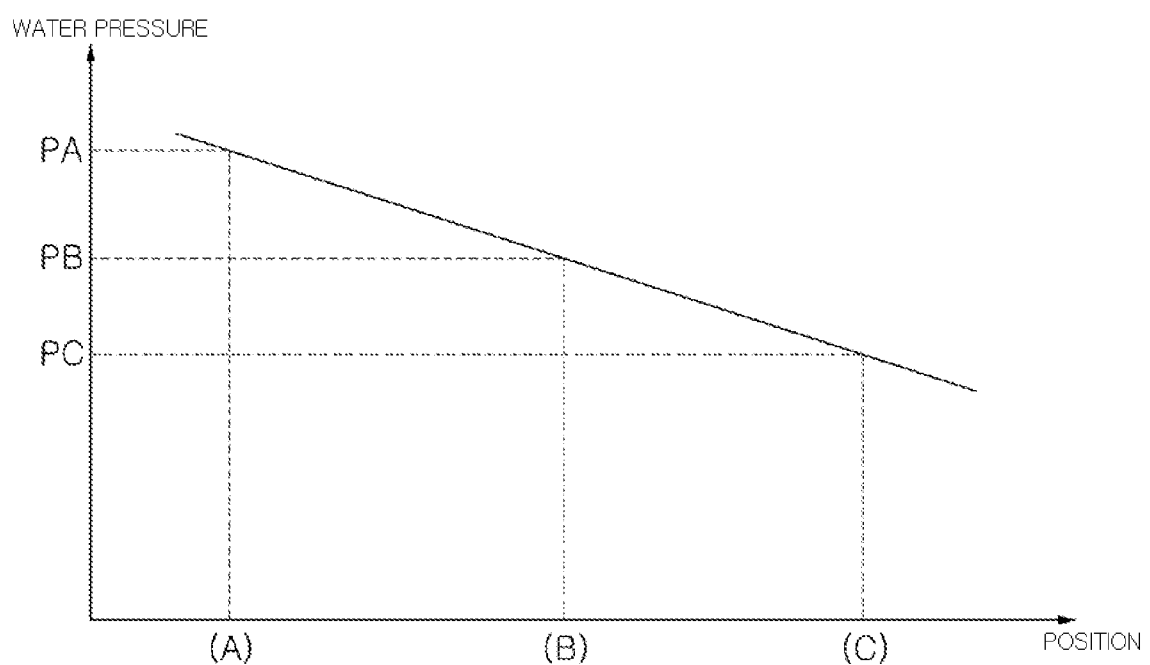
FIG. 12 is a graph illustrating water pressure in a transport conduit.

Referring to FIGS. 11 and 12, a lower port connection part 858 of the first conduit part 80a may be formed at a portion connected to the first outlet port 84a, and an upper port connection part 857 may be formed at a portion connected to the second outlet port 84b.

Likewise, in the second conduit part 80b, a lower port connection part 868 of the second conduit part 80b may be formed at a portion connected to the third outlet port 84c, and an upper port connection part 867 may be formed at a portion connected to the fourth outlet port 84d.

When viewed from the front, the respective port connection parts 857, 858, 867, and 868 may be in the shape that is convex further forward compared to a surrounding area. A width P of each of the port connection parts 857, 858, 867, and 868 may be greater than a width W of the surrounding portions. In other words, the conduits 80a and 80b may extend from the inlet port 81 with a constant width W, protrude forward convexly from the port connection parts 858 and 868, and be then reduced in width to thereby extend to the port connection parts 857 and 867 with the width W. Meanwhile, the width P of the port connection parts 857, 858, 867, and 868 may be greater than a diameter t of the outlet port 84a.

Meanwhile, referring to FIG. 15, a ring-type press-fit protrusion 869 extending in a circumferential surface may be formed on the outer surface of each of the outlet ports 84a, 84b, 84c, and 84d. The press-fit protrusion 869 may be provided in plural along the length direction of each of the outlet ports 84a, 84b, 84c, and 84d. The press-fit protrusion 869 may have a wedge-shaped cross section. When the first outlet port 84a is inserted into the port receiving pipe 64a, 64b, 64c, or 64d, the press-fit protrusion 869 presses the inner circumferential surface of the port receiving pipe 64a, 64b, 64c, or 64d to thereby increase a coupling force.

If a direction in which the outlet ports 84b, 84c, and 84d are inserted into the port receiving pipes 64a, 64b, 64c, and 64d is defined as a first direction, the press-fit protrusion 869 may include a vertical surface and a slope surface that is inclined so that a height thereof is gradually reduced from the vertical surface toward the first direction. When the outlet ports 84, 84b, 84c, and 84d are inserted into the port receiving pipe 64a, 64b, 64c, and 64d, press fitting is enabled easily due to the slope surface. After the press fitting is completed, the outlet ports 84, 84b, 84c, and 84d are not allowed to be separated from the port receiving pipes 64a, 64b, 64c, and 64d easily due to the vertical surface. The distribution pipe 801 is capable of being coupled to the gasket 60 without using a binding member (e.g., a clamp), and thus, a work time for screwing the binding member is not required Meanwhile, while the outlet ports 84a, 84b, 84c, and 84d are inserted into the port receiving pipes 64a, 64b, 64c, and 64d, end portions of each of the outlet ports 84a, 84b, 84c, and 84d are able to reach the nozzle conduit 651. At this point, the inner circumferential surface of each of the outlet ports 84a, 84b, 84c, and 84d and the inner circumferential surface of the conduit 651 forms a substantially continuing surface, thereby reducing resistance of circulating water. The nozzle conduit 651 has an annular shape, protrudes from the inner circumferential surface of the outer circumferential part 632, and is connected to a corresponding nozzle head 652.

Figure 19:
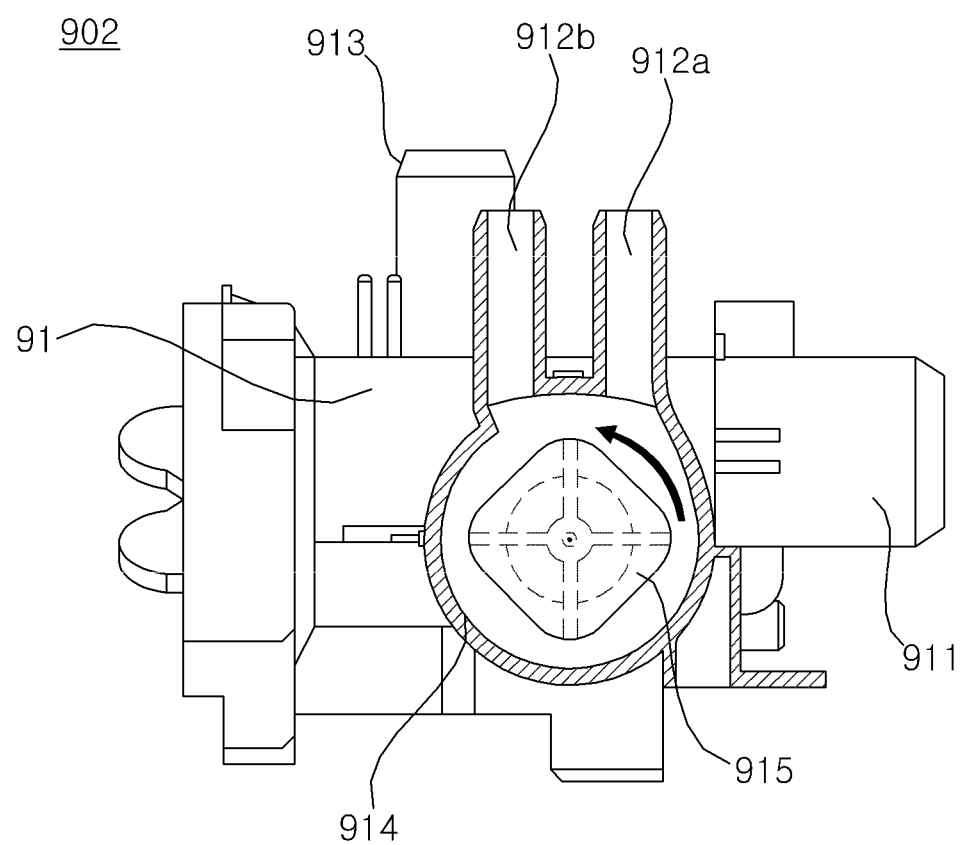
FIG. 19 illustrates a partial cut-away view of a pump applied to a washing machine according to another embodiment of the present invention.
Figure 20:
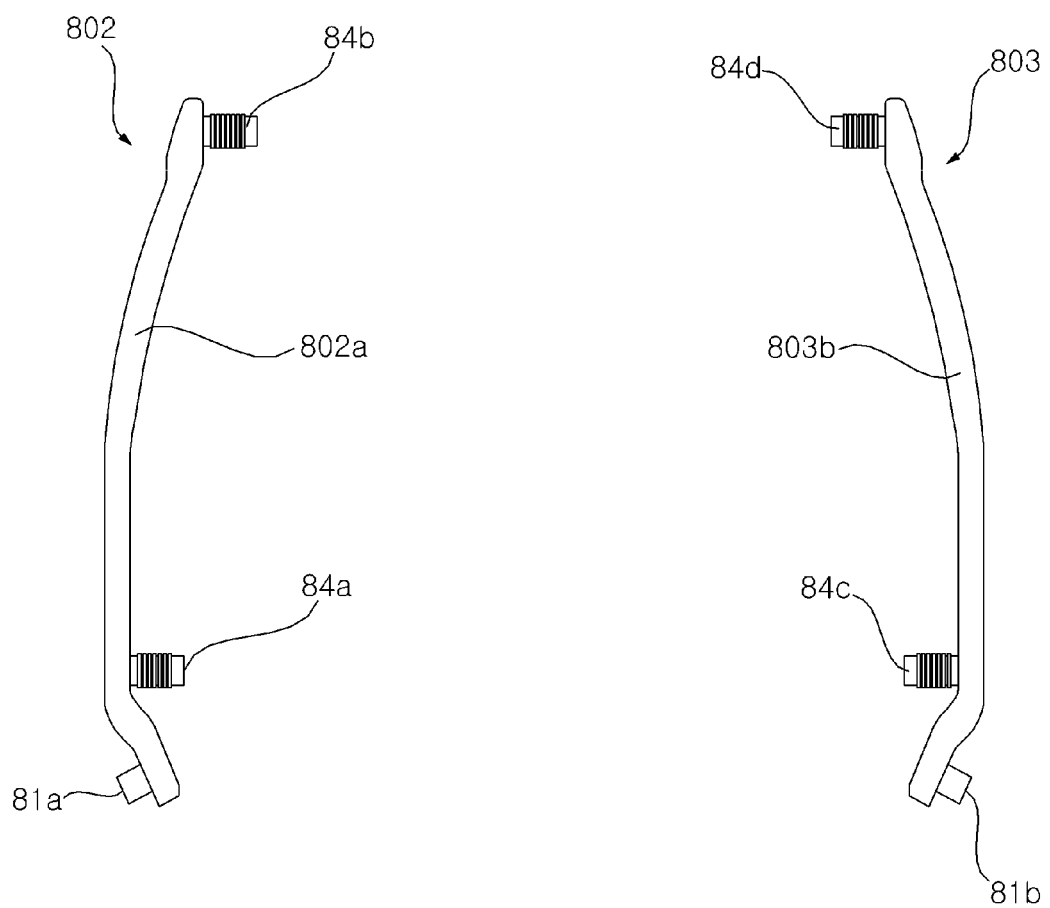
FIG. 20 illustrates a first distribution pipe and a second distribution pipe applied to a washing machine according to another embodiment of the present invention.

FIG. 19 is a partial cut-away view of a pump applied to a washing machine according to another embodiment of the present invention. FIG. 20 illustrates a first distribution pipe and a second distribution pipe applied to another embodiment of the present invention.

Referring to FIGS. 19 and 20, unlike the above-described embodiment, two distribution pipes 802 and 803 may be installed in the gasket 60. The two distribution pipes 802 and 803 may include a first distribution pipe 802 disposed on one side of the reference line L, and a second distribution pipe 803 disposed on the other side of the reference line L.

There is provided a pump 902 for supplying circulating water to the two distribution pipes 802 and 803. The pump 902 may include two circulation ports 912a and 912b. Although not illustrated in the drawings, two circulation pipes connect the circulation ports 812a and 912b to the distribution pipes 802 and 803, respectively.

More particularly, the pump 902 includes a pump housing 91, an impeller 915 disposed in the pump housing 915, and a pump motor 92 configured to provide a torque to rotate the impeller 915.

The pump housing 91 forms a chamber where the impeller 915 is housed. The pump housing 91 includes an water introducing port 911 connected to a discharge hose 72 to guide circulating water into the chamber, and a first circulation port 912 and a second circulation port 912b for discharging water pumped by the impeller 915.

A water current formed upon rotation of the impeller 815 by the pump motor 92 is discharged through the first circulation port 912a and the second circulation port 912b at the same time. In this case, water discharged through the first circulation port 912a is supplied to the first distribution pipe 802 through a first circulation pipe (not shown), and water discharged through the second circulation port 912b is supplied to the second distribution pipe 803 through a second circulation pipe (not shown).

The first distribution pipe 912a supplies circulating water to a first nozzle 65a and a second nozzle 65b. The first distribution pipe 912a may include a first inlet port 81a connected to the first circulation port 912a through the first circulation pipe, a first conduit part 80a guiding circulating water introduced through the first inlet port 81a, and two outlet ports 83a and 84b disposed in the first conduit part 80a.

The two outlet ports 83a and 84b may be inserted into a first port receiving pipe 64a and a second port receiving pipe 64b, respectively.

The second distribution pipe 803 supplies circulating water to the third nozzle 65c and the fourth nozzle 65d. The second distribution pipe 803 may include a second inlet port 81b connected to the second circulation port 912b by the second circulation pipe, a second conduit part 80b guiding circulating water introduced through the second inlet port 81b, and two outlet ports 84c and 84d disposed in the second conduit part 80b.

The two outlet ports 84c and 84d may be inserted into the third port receiving pipe 64c and the fourth port receiving pipe 64d, respectively.

Meanwhile, the pump housing 91 may further include a discharge port 913 connected to the drain pipe 74. Like the above-described embodiment, the pump 901 may further include a chamber 916 into which circulating water is introduced through the water introducing port 911 and which communicates with the discharge port 913, an impeller 917 rotating in the chamber 916, and a second pump motor 93 rotating the impeller 917 (see FIGS. 3 and 4).

Figure 23:
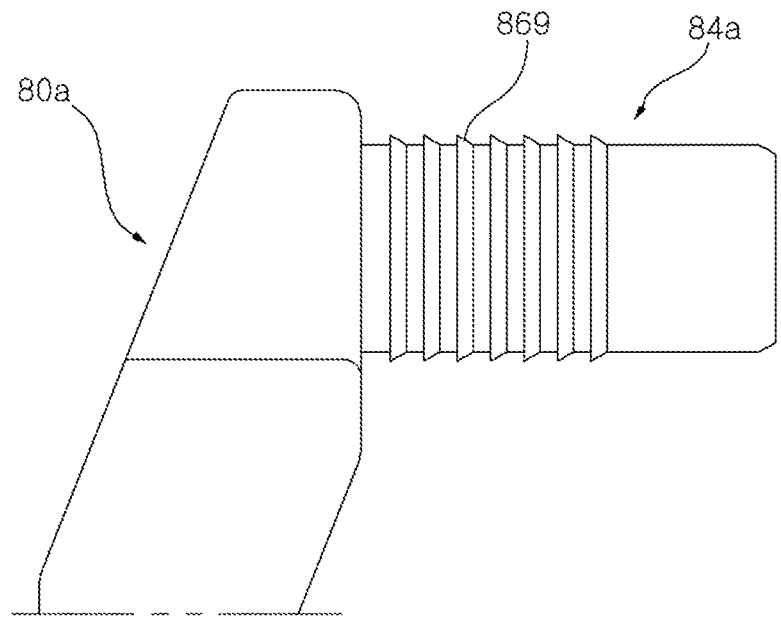
FIG. 23 is an enlarged view of a structure in which a press-fitting protrusion is formed at an outlet port in a distribution pipe according to an embodiment of the present invention.
Figure 24:
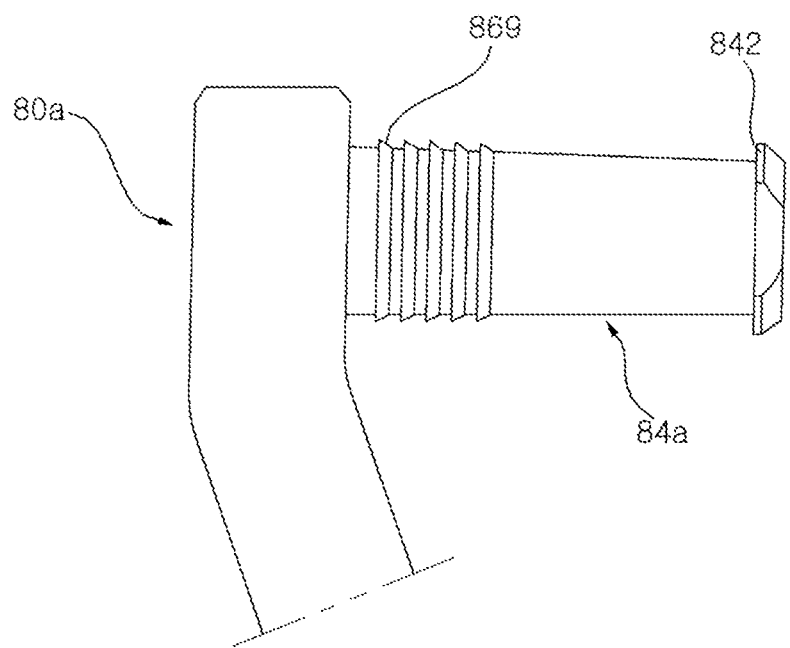
FIG. 24 is a partial view illustrating a outlet port of a distribution pipe according to another embodiment of the present invention.
Figure 25:
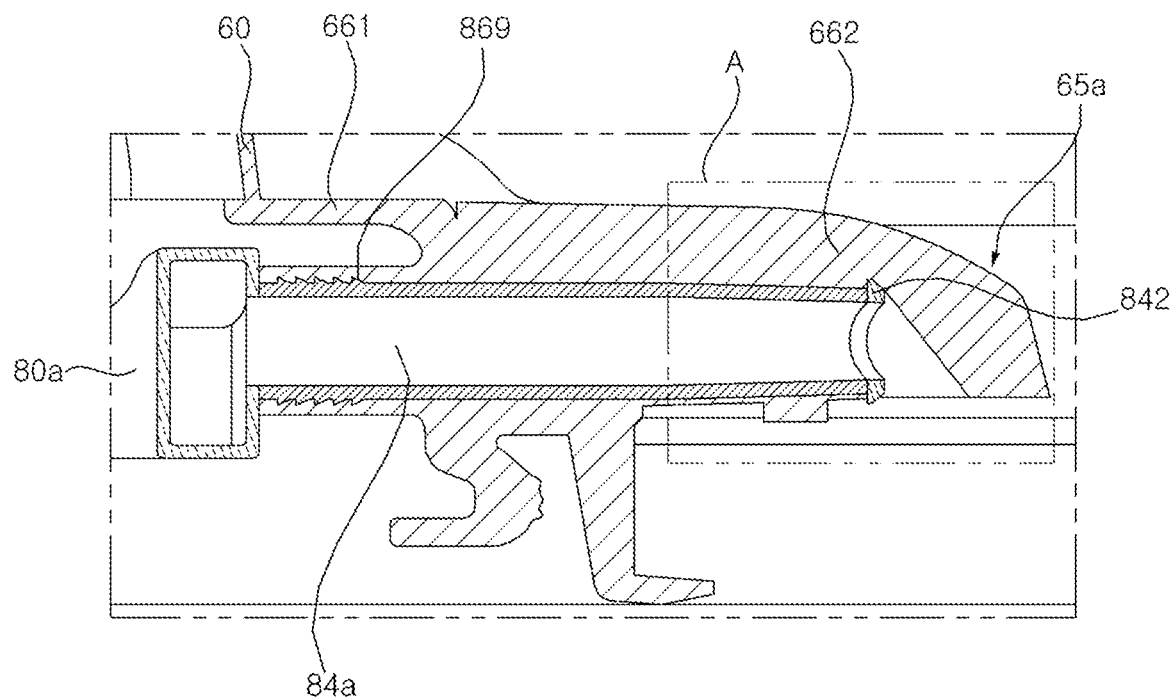
FIG. 25 is a cross-sectional view illustrating a state in which the outlet port of the distribution pipe shown in FIG. 24 is inserted into a port receiving pipe.
Figure 26:
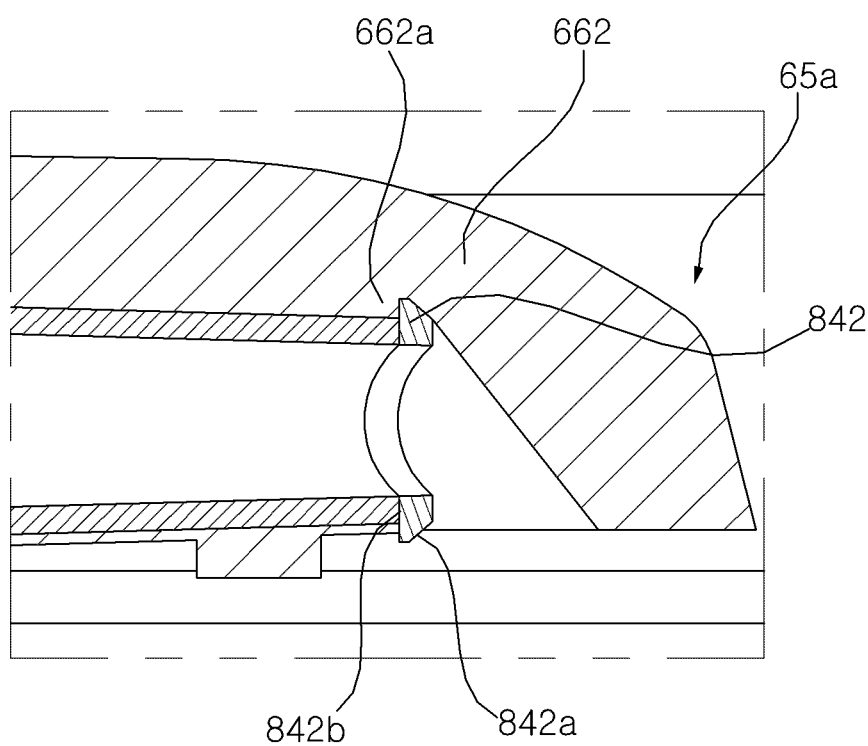
FIG. 26 is an enlarged view of a portion A shown in FIG. 25.

FIG. 23 is an enlarged view of a structure in which a press-fit protrusion is formed in an outlet port in distribution pipes according to embodiments of the present invention. FIG. 24 is a partial view of an outlet port in a distribution pipe according to another embodiment of the present invention. FIG. 25 is a cross-sectional view of a distribution pipe of which an outlet port is inserted into a port receiving pipe. FIG. 26 is an enlarged view of a portion A in FIG. 25.

Hereinafter, referring to FIGS. 23, 24, and 25, a press-fit protrusion 869 and an end protrusion 842 formed in the upper outlet port 84b will be described with reference to FIGS. 23 and 25. However, the protrusions 869 and 842 may be applied to other outlet ports described above with reference to FIGS. 1 to 22.

Referring to FIGS. 23, 24, and 25, the press-fit protrusion 869 may be formed in an outer circumferential surface of the outlet port 84b. The end protrusion 842 may be formed at an end of the outlet port 84b.

According to an embodiment, the press-fit protrusion 869 alone may be formed in the outlet port 84b, as shown in FIG. 23, or both the press-fit protrusion 869 and the end protrusion 842 may be formed in the outlet port 84b, as shown in FIG. 24.

A diameter of the nozzle 65b may be gradually reduced from an entrance 661 toward an exit 662. As the outlet port 84b is pressed toward the exit 662 of the nozzle 65b, the exit 662 having a small diameter may more strongly press the end of the outlet port 84b to thereby tightly couple the outlet port 84b and the nozzle 65b.

The exit 662 include an annular stepped portion 662a toward the inside of the drum 40. The end protrusion 842 may be formed at the end of the outlet port 84b to be thereby hook-coupled to the stepped portion 662a when being press-fitted to the nozzle 65b of the outlet port 84b.

The end protrusion 842 may protrude in a ring shape along the end of the outlet port 64b. A predetermined slope 842a is formed in a press-fitting direction of the outlet port 64b. A vertical surface 842b is formed in a direction opposite to the press-fitting direction of the outlet port 64b. Accordingly, the vertical surface 842b and the stepped portion 662a are hook coupled to each other at a time when the vertical surface 842b and the stepped portion 662a contact each other.

Since the slope 842a is formed in the press-fitting direction of the outlet port 84b, the outlet port 84b may move smoothly until the end protrusion 842 is hooked by the stepped portion 662a. In addition, since the vertical surface 842b and the stepped portion 662a are in surface contact, tightness between the vertical surface 842b and the stepped portion 662a improves, and thus, even if a force is applied to the outlet port 84b in a direction opposite to the press-fitting direction, the outlet port 84b may not be separated easily.

In addition, the stepped portion 662a is formed in a direction opposite to a direction in which a force is applied to the outlet port 84a upon a supply of circulating water to the drum 40, and thus, the stepped portion 662a prevents separation of the outlet port 84a and fixes the outlet port 84b to the gasket 60.

In conclusion, movement of the outlet port 84a is restricted by the press-fitting protrusion 869 at the entrance 661, and the end protrusion 842 and the stepped portion 662a are hook-coupled at the exit 662 to thereby fix the outlet port 84a. Accordingly, although water pressure, vibration, and any other external force is applied while circulating water circulates, the distribution pipes 801, 802, and 803 are not easily separated from the gasket 60.

Meanwhile, the above description regarding the press-fitting protrusion 869, the end protrusion 842, and a coupling relationship therebetween may apply to the present invention and any other embodiment.

As illustrated in FIG. 11, an outer diameter of the first outlet port 84a is indicated by t1, and an inner diameter of the first outlet port 84a is indicated by DA1. An outer diameter of the second outlet port 84b is indicated by t2, an inner diameter of the second outlet port 84b is indicated by D2, and an inner cross-sectional area (or a cross-sectional flow area) is indicated by DA2. An inner diameter (or a cross-sectional flow area) of the inlet port 81 is indicated by D3, and an inner cross-sectional area of the inlet port is indicated by DA3.

Wash water introduced through the inlet port 81 is divided to the first conduit part 80a and the second conduit part 80b and then guided upwardly. Wash water guided upwardly along the first conduit part 80a may be discharged through the first outlet port 84a and the second outlet port 84b, sequentially. Likewise, wash water guided upwardly along the second conduit part 80b is discharged through the third outlet port 84c and the fourth outlet port 84d, sequentially.

Water pressure is gradually reduced while water streams are raised along the conduit parts 80a and 80b. Specifically, FIG. 12 shows the greatest water pressure PA (water pressure at a point A in FIG. 11) at the inlet port 81, the second greatest water pressure PB (water pressure at a point B in FIG. 11) at the first and third outlet ports 84a and 84c, and the lowest water pressure PC (water pressure at a point C in FIG. 11) at the second and fourth outlet ports 84b and 84d.

As above, there is difference in water pressure between the outlet ports 84a and 84c at lower positions (hereinafter, referred to as lower outlet ports) and the outlet ports 84b and 84d at upper positions (hereinafter, referred to as upper outlet ports). Thus, if the outlet ports have the same inner diameter, an amount of water discharged from the upper outlet port 84b and 84d is smaller than an amount of water discharged from the lower outlet ports 84a and 84c.

In order to compensate for the difference in an amount of discharged water between the upper and lower outlet ports 84a, 84b, 84c, and 84d, the present embodiment is implemented such that a cross-sectional flow area DA2 of each of the upper outlet ports 84b and 84d is greater than a cross-sectional flow area DA1 of each of the lower outlet ports 84a and 84c. PB*DA1=PC*DA2 is preferable. In addition, DA1>DA2>DA3 is preferable.

Meanwhile, the distribution pipe 80 is disposed between the outer circumferential surface of the gasket body 63 and the balancer 90. More specifically, referring to FIG. 10, at least a portion of the distribution pipe 80 may be disposed in a recessed portion formed in the outer circumferential surface of the gasket body 63. In order to correspond go the first conduit part 80a and the second conduit part 80b, a recessed portion 67 may be formed on both sides of the gasket body 63. (see 67 (a) in FIGS. 5 and 67(2) in FIG. 7).

One end of the circulation pipe 86 may be connected to the inlet port protruding from the bottom of the distribution pipe 80, and the other end of the circulation pipe 86 is connected to the outlet port 84 of the pump 901. If the outlet port 84 of the pump 901 is disposed at a position facing the inlet port 81 in a straight line, the circulation pipe 86 may be in a straight pipe shape. However, in other cases, the circulation pipe 86 may be formed by bending.

The circulation pipe 86 may be formed of a substance that is flexible and maintained in shape. In an embodiment of the present invention, the circulation pipe 86 may be formed of ethylene propylene diene monomer rubber (EPDM).

The recessed portion 67 may be formed in the outer circumferential surface of the gasket body 63, and at least a portion of the transport conduit 80*a* and 80*b* may be seated in the recessed portion 67. The recessed portion 67 may be formed in a manner in which a portion of the outer circumferential surface 61 of the gasket body 63 is recessed inward. Specifically, a relatively outwardly raised portion may be formed in the outer circumferential surface 61 of the gasket body 63, and the recessed portion 67 may be formed in the raised portion.

The tub 30 vibrates during rotation of the drum, and the gasket 60 formed of a flexible substance may be folded or unfolded by the vibration of the tub 30 and accordingly the gasket 60 may vibrate.

Since the casing 10 and the tub 30 is regarded rigid, deformation of the gasket 60 at a portion connected to the casing 10 or the tub 30 is insignificant. Accordingly, the recessed portion 67 is formed at a position adjacent to the tub coupling part 62 rather than the casing coupling part 61 (see FIG. 10) so as to prevent excess deformation of the recessed portion 67 and allow the transport conduit 80 to be stably seated in the recessed portion 67. In this regard, it is preferable that the recessed portion 67 is formed in the outer circumferential part 632.

The recessed portion 67 may extend on a circumference of the gasket body 63 in a circumferential direction. The recessed portion 67 may include a bottom surface 67*a* forming the bottom of a groove, and a side surface 67*b* extending from the bottom surface 63*a* toward an outer side of a radial direction to form a side surface of the groove. The recessed portion 67 may have an open rear surface facing the tub 30, and a front surface of the recessed portion 67 may be defined by the side surface 63*b*.

The transport conduit 80*a* and 80*b* may have a cross section in which a height defined in a radial direction is shorter than a width defined in a length direction of the gasket 60 (or a front-back direction of the washing machine). That is, the transport conduit 80*a* and 80*b* may have a cross section in which a width corresponding to the bottom surface 63*a* of the recessed portion 76 is longer than a height corresponding to the side surface 63*b* of the recessed portion 67. For example, the cross section of the transport conduit 80*a* and 80*b* may have an approximate rectangular shape, and, in this case, a long edge of the rectangular shape constitutes the aforementioned width and a short edge of the rectangular shape constitutes the aforementioned height.

In the exterior appearance of the transport conduit 80, a height thereof corresponds to a gap between the gasket 60 and the balancer 90. Accordingly, the above-described exterior appearance having a height shorter than a width allows the transport conduit 80 to be installed in a narrow space between the gasket 60 and the balancer 90.

In order to allow the transport conduit 80*a* and 80*b* to be disposed in the recessed portion 67, a width of the bottom surface 63*a* of the recessed portion 67 may be equal to or greater than a width of the transport conduit 80.

The recessed portion 67 may be have a U shape, as does the transport conduit 80. Both upper ends of the U shape may extend upward above the both upper ends of the transport conduit 80 (that is, the upper end of the first conduit part 80*a* and the upper end of the second conduit part 80*b*). In other words, the recessed portion 67 may extend at both sides from the bottom of the gasket 60 along a circumferential direction. One side of the recessed portion 67 extends further above the upper end of the first conduit part 80*a*, and the other side of the recessed portion 67 may extend further above the upper end of the second conduit part 80*b*.

Alternatively, recessed portions 76 may be respectively formed on the left and right sides with respect to the reference line L. In this case, the recessed portions on the both sides 67 are separated. At least a portion of the first conduit part 80*a* may be seated in a recessed portion formed on the left side, and at least a portion of the second conduit part 80*b* may be seated in a recessed portion formed on the right side.

Preferably, a horizontal line passing through the center O of the gasket 60 passes the recessed portions 67 formed on the left and right sides of the gasket 60. The casing 10 is a cuboid shape which is longer in a left-right direction than in a top-bottom direction. In this case, a gap between the tub 30 and the casing 10 is narrower in the left-right direction than in the top-bottom direction of the tub 30. Accordingly, the recessed portions are disposed at a position at which the gap between the casing 10 and the tub 30 is narrowest, and which the horizontal line passes through. Hence the first and second conduit parts 80(*a*) and 80(*b*) may be spaced apart as far as possible.

Figure 21:
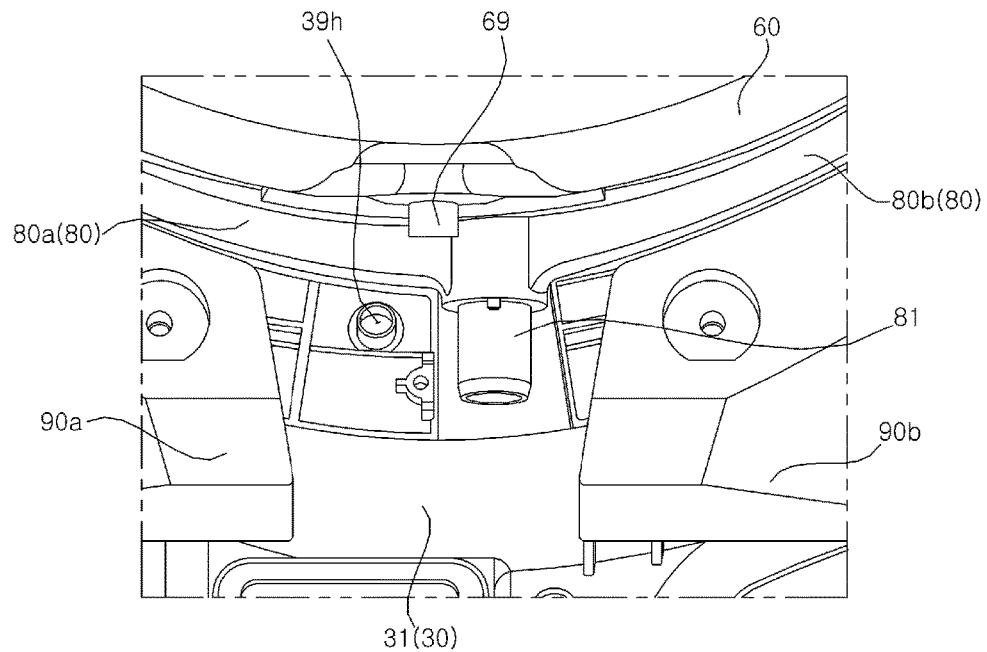
FIGS. 21 and 22 are partial view illustrating a state in which a distribution pipe is installed to a gasket, which illustrate especially a residual water discharge port and a residual water collecting hole formed in the gasket.
Figure 22:
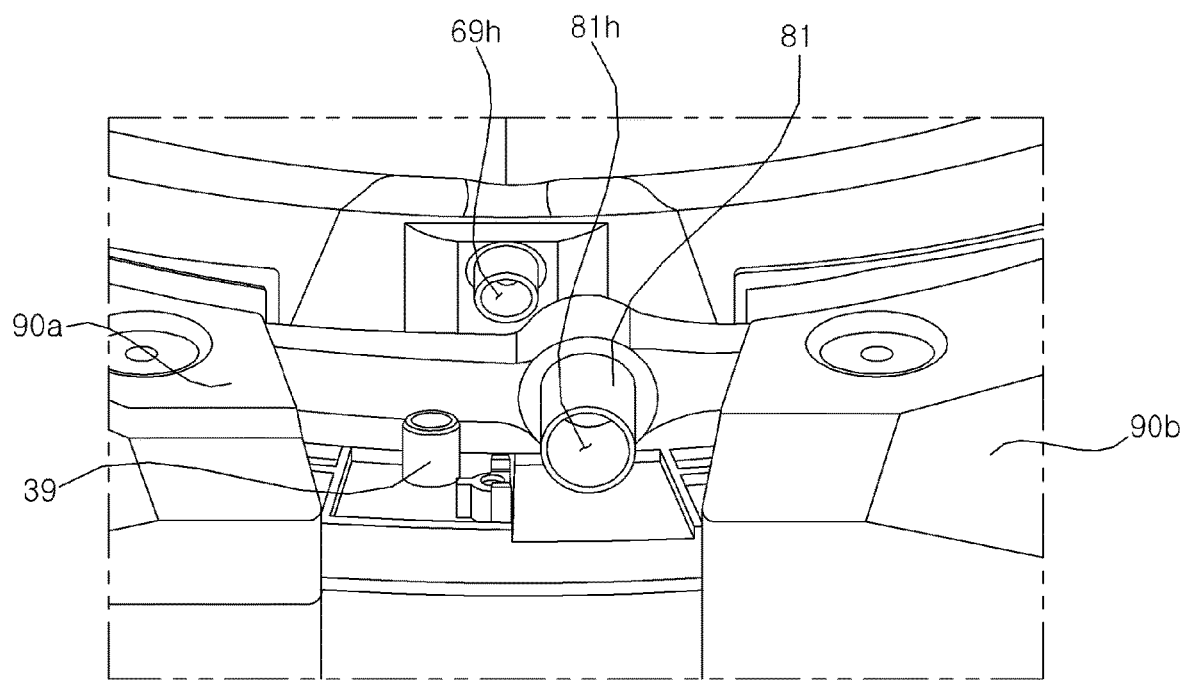

FIGS. 21 and 22 are partial views illustrating the case where a distribution pipe is installed to a gasket, the views which show especially a residual water discharge port and a residual water collecting port formed in the gasket.

Referring to FIGS. 21 and 22, a residual water discharge hole 69*h* may be formed in the gasket 60 to discharge water remaining on the inner circumferential surface of the gasket 63 (hereinafter, referred to as "residual water").

The residual water discharge hole 69*h* may be connected to the outside of the washing machine or the pump 901 through a predetermined tube. In the latter case, the residual water discharge hole 69*h* may be discharged through the drain pipe 74 when the second impeller is rotated.

However, aspects of the present invention are not limited thereto, and residual water may be collected to the tub 30 by connecting the residual water discharge hole 69*h* to the tub 30, and this will be hereinafter described in more detail.

A residual water collecting hole 39*h* may be formed in the tub 30. The residual water collecting hole 39*h* may be formed in the front surface 31 of the tub 30. A residual water collecting pipe 100 allowing the residual water collecting hole 39*h* and the residual water discharge hole 69*h* to communicate with each other may be provided.

The residual water collecting hole 39*h* is disposed lower than the residual water discharge hole 69*h*. Accordingly, residual water collected on the inner circumferential surface of the gasket body 63 may be naturally drained to the residual water collecting hole 39*h* through the residual water collecting pipe 100.

On the outer circumferential surface 61 of the gasket body 63, the residual water discharge port 69 communicating with the residual water discharge hole 69*h* may protrude downward. On the front surface 31 of the tub 30, the residual water collecting port 39 communicating with the residual water collecting hole 39*h* may protrude forward.

The residual water discharge port 69 may be connected to an upper end of the residual water collecting pipe 100, and the residual water collecting port 39 may be connected to a lower end of the residual water collecting pipe 100. Specifically, the both ends of the residual water collecting pipe 100 may be inserted into the residual water discharge port 69 and the residual water collecting port 39. In this case, the both ends of the residual water colleting pipe 100 overlapping the residual water discharge port 69 and the residual water collecting port 39 may be screwed with clamps to thereby fix the residual water colleting pipe 100.

The inlet port 81 of the distribution pipe 801 is disposed on one side of the residual water discharge port 69. When viewed from the front, the inlet port 81 and the residual water discharge port 69 are disposed in areas not overlapping each other, and hence, it is possible to prevent interference with the inlet port 81 when installing the residual water collecting pipe 100.

Meanwhile, the residual water discharge port 69 may be disposed between a lower end of the first balancer 90*a* and a lower end of the second balancer 90*b*. The inlet port 81 may be disposed between the residual water discharge port 69 and the first balancer 90*a* or between the residual water discharge port 69 and the second balancer 90*b*.

In order to easily discharge circulating water, coming from the outlet port 84 or sprayed from the nozzles 66, remaining on the inner circumferential surface of the gasket 60, the residual water discharge port 69 may be disposed lower than the outlet ports 84*a* and 84*c* at the lowest position among the plurality of outlet ports 84*a*, 84*b*, 84*c*, and 84*d* and/or than the lowest nozzles 65*a* and 65*c*.

When viewed from the front, a central portion in the lower side of the gasket 60 meeting the reference line L may be the lowest point. The residual water discharge port 69 may be formed at the central portion of the lower side.

The distribution pipe 80 may be disposed on the circumferential surface 61 of the gasket body 63 so as to be adjacent to the tub 30, and the residual water discharge port 69 may be disposed at a front side further than the transport conduit 80*a* and 80*b* so as to avoid interference with the distribution pipe 80.

The residual water collecting hole 39*h* or the residual water collecting port 39 may be formed at a lower side further than the transport conduit 80*a* and 80*b*. The residual water colleting pipe 100 may be disposed in front of the circulating water supply pipe 80 so as to connect the residual water discharge port 69 and the residual water collecting port 39.

Meanwhile, in the case where the residual water discharge port 69 is disposed at the central portion of the lower side of the gasket body 63 and the residual water collecting hole 39*h* is disposed vertically below the residual water discharge port 69, the residual water collecting pipe 100 may be, when viewed from the front, disposed along a vertical line. In this case, to avoid interference with the residual water collecting pipe 100, the inlet port 81 needs to be spaced a predetermined distance from the residual water discharge port 69 toward a side (e.g., the right side).

The farther the inlet port 81 is disposed from the central portion, the more difficult it is to equally divide water into the first conduit part 80*a* and the second conduit part 80*b*. In consideration of the above, the residual water collecting port 39 may not be aligned on a vertical line passing the central portion but may be disposed on one side (e.g., the left side) of the residual discharge port 69, so as to place the inlet port 81 at a position as adjacent as possible to the vertical line.

Meanwhile, the residual water discharge port 69 may be formed in the gasket body 63. The residual water discharge port 69 may protrude from a lower area of the outer circumferential surface of the gasket body 63. The residual water discharge port 69 may preferably protrude from the outer circumferential part 632. However, aspects of the present invention are not limited thereto, and the residual water discharge port 69 may protrude from the inner circumferential part 631.

Although some embodiments have been described above, it should be understood that the present invention is not limited to these embodiments, and that various modifications, changes, alterations and variations can be made by those skilled in the art without departing from the spirit and scope of the invention. Therefore, it should be understood that the above embodiments are provided for illustration only and are not to be construed in any way as limiting the present invention.

What is claimed is:

1. A washing machine comprising:
    a casing that defines an entry hole at a front surface of the casing;
    a tub disposed in the casing and configured to receive wash water, the tub defining an entrance hole at a front surface of the tub;
    a drum rotatably disposed in the tub;
    a gasket comprising a gasket body that defines a passage connecting the entry hole to the entrance hole of the tub, the gasket body having a first area and a second area corresponding to bilateral areas of the gasket body;
    a plurality of nozzles configured to spray wash water into the drum, the plurality of nozzles comprising:
        a first nozzle and a second nozzle that are arranged in a bottom-to-top direction at the first area of the gasket body, and
        a third nozzle and a fourth nozzle that are arranged in the bottom-to-top direction at the second area of the gasket body;
    a pump configured to circulate wash water discharged from the tub;
    a circulation pipe configured to guide wash water discharged from the pump; and
    a distribution pipe configured to distribute wash water discharged from the circulation pipe to the plurality of nozzles,
    wherein the distribution pipe comprises:
        an inlet port connected to the circulation pipe and configured to receive wash water discharged from the pump,
        a first conduit part that is disposed at the first area on an outer circumferential surface of the gasket body and extends from the inlet port along the outer circumferential surface of the gasket body, and
        a first outlet port and a second outlet port that protrude from the first conduit part toward the outer circumferential surface of the gasket body, that are coupled to the gasket, and that are arranged in the bottom-to-top direction at the first conduit part, the first and second outlet ports being connected to the first and second nozzles, respectively,
    wherein the first conduit part includes:
        a first port connection part from which the first outlet port protrudes,
        a second port connection part from which the second outlet port protrudes, and a surrounding part that extends from the first port connection part to the second port connection part, and wherein a width of the first port connection part in a front-rear direction is greater than a width of the surrounding part in the front-rear direction.

2. The washing machine of claim 1, wherein a cross-sectional flow area of the second outlet port is greater than a cross-sectional flow area of the first outlet port.

3. The washing machine of claim 1, wherein the first outlet port and the second outlet port extend from the first conduit part in a same direction and parallel to each other.

4. The washing machine of claim 1, wherein a horizontal distance between the first outlet port and a vertical line passing through a center of the gasket body is greater than a horizontal distance between the second outlet port and the vertical line.

5. The washing machine of claim 1, wherein the first conduit part comprises an inner circumferential part that defines a first flat surface facing the gasket body and having a flat shape, and wherein the first outlet port protrudes from the first flat surface toward the gasket body.

6. The washing machine of claim 5, wherein the first outlet port extends in a direction orthogonal to the first flat surface.

7. The washing machine of claim 1, wherein the first conduit part comprises an inner circumferential part that defines a second flat surface facing the gasket body and having a flat shape, and wherein the second outlet port protrudes from the second flat surface toward the gasket body.

8. The washing machine of claim 7, wherein the second outlet port extends in a direction orthogonal to the second flat surface.

9. The washing machine of claim 1, wherein the first outlet port is disposed lower than half a height of the gasket body, and wherein the second outlet port is disposed higher than half the height of the gasket body.

10. The washing machine of claim 1, wherein the gasket further comprises a first port receiving pipe and a second port receiving pipe that protrude from the outer circumferential surface of the gasket body, the first and second port receiving pipes being configured to receive the first and second outlet ports, respectively, and wherein the first and second port receiving pipes are configured to communicate with the first and second nozzles, respectively.

11. The washing machine of claim 1, wherein the distribution pipe further comprises:

a second conduit part disposed at the second area on the outer circumferential surface of the gasket body and extends along the outer circumferential surface of the gasket body from the inlet port, and a third outlet port and a fourth outlet port that protrude from the second conduit part toward the outer circumferential surface of the gasket body, that are coupled to the gasket, that are arranged in the bottom-to-top direction, the third and fourth outlet ports being connected to the third nozzle and the fourth nozzle, respectively.

12. The washing machine of claim 11, wherein the first outlet port and the third outlet port are disposed symmetrically with respect to a reference line that bilaterally divides the gasket body.

13. The washing machine of claim 12, wherein the second outlet port and the fourth outlet port are disposed symmetrically with respect to the reference line.

\* \* \* \* \*